US011869166B2

(12) United States Patent
Nakata et al.

(10) Patent No.: US 11,869,166 B2
(45) Date of Patent: Jan. 9, 2024

(54) MICROSCOPE SYSTEM, PROJECTION UNIT, AND IMAGE PROJECTION METHOD

(71) Applicant: Evident Corporation, Nagano (JP)

(72) Inventors: Tatsuo Nakata, Tokyo (JP); Akifumi Kabeya, Tokyo (JP); Takashi Yoneyama, Tokyo (JP); Hiroshi Sasaki, Tokyo (JP)

(73) Assignee: Evident Corporation, Nagano (JP)

( * ) Notice: Subject to any disclaimer, the term of this patent is extended or adjusted under 35 U.S.C. 154(b) by 294 days.

(21) Appl. No.: 17/195,916

(22) Filed: Mar. 9, 2021

(65) Prior Publication Data

US 2021/0192179 A1   Jun. 24, 2021

Related U.S. Application Data

(63) Continuation of application No. PCT/JP2018/047498, filed on Dec. 25, 2018.

(30) Foreign Application Priority Data

Sep. 28, 2018   (JP) ................................. 2018-183762

(51) Int. Cl.
*G06K 9/00* (2022.01)
*G06T 3/00* (2006.01)
(Continued)

(52) U.S. Cl.
CPC .......... *G06T 3/0025* (2013.01); *G06T 3/0068* (2013.01); *G06T 7/215* (2017.01);
(Continued)

(58) Field of Classification Search
CPC .................................................. G06T 7/0012
See application file for complete search history.

(56) References Cited

U.S. PATENT DOCUMENTS

| 4,672,559 A | 6/1987 | Jansson et al. |
| 6,239,909 B1 | 5/2001 | Hayashi et al. |

(Continued)

FOREIGN PATENT DOCUMENTS

| EP | 0186490 B1 | 3/1993 |
| JP | S61156214 A | 7/1986 |

(Continued)

OTHER PUBLICATIONS

Chinese Office Action (and English language translation thereof) dated May 12, 2022, issued in Chinese Application No. 201880097755.4 (which is a counterpart of related U.S. Appl. No. 17/196,634).

(Continued)

*Primary Examiner* — Hadi Akhavannik
(74) *Attorney, Agent, or Firm* — Holtz, Holtz & Volek PC

(57) ABSTRACT

A microscope system comprising an eyepiece, an objective that guides light from a sample to the eyepiece, a tube lens that is disposed on a light path between the eyepiece and the objective and forms an optical image of the sample on the basis of light therefrom, a projection apparatus that projects a projection image including a first assistance image onto an image plane on which the optical image is formed, and a processor that performs processes. The processes include generating projection image data representing the projection image. The first assistance image is an image of the sample in which a region wider than an actual field of view corresponding to the optical image is seen, The first assistance image is projected onto a portion of the image plane that is close to an outer edge of the optical image.

24 Claims, 22 Drawing Sheets

(51) Int. Cl.
*G06T 7/215* (2017.01)
*G06T 7/70* (2017.01)
*G06V 20/69* (2022.01)
*H04N 23/67* (2023.01)
*G06V 10/764* (2022.01)
*G06V 10/82* (2022.01)

(52) U.S. Cl.
CPC .............. *G06T 7/70* (2017.01); *G06V 10/764* (2022.01); *G06V 10/82* (2022.01); *G06V 20/693* (2022.01); *G06V 20/695* (2022.01); *H04N 23/67* (2023.01); *G06T 2207/10056* (2013.01); *G06T 2207/20021* (2013.01)

(56) References Cited

U.S. PATENT DOCUMENTS

| | | | |
|---|---|---|---|
| 6,304,372 | B1 | 10/2001 | Spink |
| 6,483,948 | B1 | 11/2002 | Spink et al. |
| 7,428,324 | B2 | 9/2008 | Crandall et al. |
| 9,971,966 | B2 | 5/2018 | Nelson et al. |
| 10,078,205 | B2 | 9/2018 | Hauger et al. |
| 2001/0055062 | A1 | 12/2001 | Shioda et al. |
| 2003/0123717 | A1 | 7/2003 | Bacus et al. |
| 2006/0228107 | A1 | 10/2006 | Takamatsu et al. |
| 2007/0076232 | A1 | 4/2007 | Olschewski et al. |
| 2007/0147673 | A1 | 6/2007 | Crandall |
| 2012/0013728 | A1 | 1/2012 | Matsuo |
| 2013/0044185 | A1 | 2/2013 | Krishnaswamy et al. |
| 2013/0070077 | A1 | 3/2013 | Winkelman et al. |
| 2013/0188033 | A1 | 7/2013 | Oda et al. |
| 2014/0072195 | A1 | 3/2014 | Zhang et al. |
| 2014/0160264 | A1 | 6/2014 | Taylor et al. |
| 2014/0314299 | A1 | 10/2014 | Santamaria-Pang et al. |
| 2014/0333997 | A1 | 11/2014 | Oda |
| 2014/0340426 | A1 | 11/2014 | Furuhata |
| 2015/0049936 | A1 | 2/2015 | Tsunomori et al. |
| 2015/0130920 | A1 | 5/2015 | Zou et al. |
| 2015/0209116 | A1 | 7/2015 | Wirth et al. |
| 2015/0213599 | A1* | 7/2015 | Buzaglo ............... G06V 10/454 382/128 |
| 2015/0370059 | A1 | 12/2015 | Hoegele et al. |
| 2016/0062098 | A1 | 3/2016 | Brown |
| 2016/0103308 | A1 | 4/2016 | Furuya |
| 2016/0116724 | A1 | 4/2016 | Abe |
| 2016/0166194 | A1 | 6/2016 | Gareau et al. |
| 2016/0170194 | A1 | 6/2016 | Mueller et al. |
| 2016/0206198 | A1 | 7/2016 | Weber |
| 2016/0266369 | A1 | 9/2016 | Hauger et al. |
| 2016/0357003 | A1 | 12/2016 | Hauger et al. |
| 2017/0262984 | A1 | 9/2017 | Barnes et al. |
| 2018/0267287 | A1 | 9/2018 | Regensburger et al. |
| 2018/0275388 | A1 | 9/2018 | Zou et al. |
| 2018/0307034 | A1 | 10/2018 | Saur et al. |
| 2018/0348496 | A1 | 12/2018 | Brown |
| 2019/0076020 | A1 | 3/2019 | Steffen et al. |
| 2019/0195777 | A1 | 6/2019 | Matsubara |
| 2020/0211233 | A1* | 7/2020 | Siegel .................... G06F 3/013 |
| 2021/0191101 | A1 | 6/2021 | Kabeya et al. |
| 2021/0192179 | A1 | 6/2021 | Nakata et al. |
| 2021/0192181 | A1 | 6/2021 | Yoneyama et al. |
| 2021/0215923 | A1 | 7/2021 | Nakata et al. |
| 2021/0319208 | A1 | 10/2021 | Ohara et al. |

FOREIGN PATENT DOCUMENTS

| | | | |
|---|---|---|---|
| JP | H05080255 | A | 4/1993 |
| JP | H07253548 | A | 10/1995 |
| JP | H08029694 | A | 2/1996 |
| JP | H11211988 | A | 8/1999 |
| JP | H11242189 | A | 9/1999 |
| JP | 2000292422 | A | 10/2000 |
| JP | 2001519944 | A | 10/2001 |
| JP | 2003116874 | A | 4/2003 |
| JP | 2005351916 | A | 12/2005 |
| JP | 2006071430 | A | 3/2006 |
| JP | 2006292999 | A | 10/2006 |
| JP | 2006297060 | A | 11/2006 |
| JP | 2008090072 | A | 4/2008 |
| JP | 2012019748 | A | 2/2012 |
| JP | 2013054083 | A | 3/2013 |
| JP | 2013072997 | A | 4/2013 |
| JP | 2014063041 | A | 4/2014 |
| JP | 2014222321 | A | 11/2014 |
| JP | 2015141420 | A | 8/2015 |
| JP | 2016517115 | A | 6/2016 |
| JP | 2016133668 | A | 7/2016 |
| JP | 2016526185 | A | 9/2016 |
| JP | 2017161262 | A | 9/2017 |
| JP | 2018010021 | A | 1/2018 |
| JP | 2018054425 | A | 4/2018 |
| JP | 2018066908 | A | 4/2018 |
| JP | 2018128532 | A | 8/2018 |
| WO | 2012117647 | A1 | 9/2012 |
| WO | 2013094434 | A1 | 6/2013 |
| WO | 2016130424 | A1 | 8/2016 |
| WO | 2018042413 | A1 | 3/2018 |
| WO | WO-2018042413 | A1 * | 3/2018 ............. G02B 21/18 |

OTHER PUBLICATIONS

Microscope World, Infinity Corrected Optics, Apr. 2015, www.microscopeworld.co/t-infinity corrected optics.aspx (Year: 2015).
Office Action (Non-Final Rejection) dated Jun. 22, 2022, issued in related U.S. Appl. No. 17/196,921.
Office Action (Non-Final Rejection) dated Apr. 11, 2022, issued in related U.S. Appl. No. 17/196,634.
Chinese Office Action dated May 7, 2022, issued in counterpart Chinese Application No. 201880097760.5.
International Search Report (ISR) (and English translation thereof) dated Mar. 12, 2019 issued in International Application No. PCT/JP2018/047499.
International Search Report (ISR) (and English translation thereof) dated Mar. 26, 2019 issued in International Application No. PCT/JP2018/047492.
International Search Report (ISR) (and English translation thereof) dated Mar. 26, 2019 issued in International Application No. PCT/JP2018/047494.
U.S. Appl. No. 17/196,634, First Named Inventor: Akifumi Kabeya; Title: "Microscope System, Projection Unit, and Image Projection Method"; filed Mar. 9, 2021.
U.S. Appl. No. 17/196,705, First Named Inventor: Tatsuo Nakata; Title: "Microscope System"; filed Mar. 9, 2021.
U.S. Appl. No. 17/196,921, First Named Inventor: Takashi Yoneyama; Title: "Microscope System and Projection Unit"; filed Mar. 9, 2021.
Japanese Office Action dated Apr. 5, 2022 (and English translation thereof) issued in Japanese Application No. 2020-547904 (which is a counterpart of related U.S. Appl. No. 17/196,921).
International Search Report (ISR) (and English translation thereof) dated Mar. 26, 2019 issued in International Application No. PCT/JP2018/047498.
Japanese Office Action (and English language translation thereof) dated Apr. 19, 2022, issued in Japanese Application No. 2020-547901 (which is a counterpart of related U.S. Appl. No. 17/196,634).
Japanese Office Action (and English language translation thereof) dated Apr. 19, 2022, issued in counterpart Japanese Application No. 2020-547903.
Japanese Office Action (and English language translation thereof) dated Apr. 26, 2022, issued in Japanese Application No. 2020-547902 (which is a counterpart of related U.S. Appl. No. 17/196,705).
U.S. Appl. No. 17/196,634, filed Mar. 9, 2021.
U.S. Appl. No. 17/196,705, filed Mar. 9, 2021.
U.S. Appl. No. 17/196,921, filed Mar. 9, 2021.
Chinese Office Action (and English language translation thereof) dated Jul. 5, 2022, issued in Chinese Application No. 201880097759.2 (which is a counterpart of related U.S. Appl. No. 17/196,921).
Japanese Office Action dated Apr. 5, 2022 (and English translation thereof) issued in Japanese Application No. 2020-547904.

(56) References Cited

OTHER PUBLICATIONS

Chinese Office Action dated Apr. 29, 2022, issued in Chinese Application No. 201880097737.6 (which is a counterpart of related U.S. Appl. No. 17/196,705).
Japanese Office Action (and English language translation thereof) dated Nov. 1, 2022, issued in Japanese Application No. 2020-547904 (which is a Japanese counterpart of related U.S. Appl. No. 17/196,921).
Extended European Search Report (EESR) dated Aug. 11, 2023, issued in counterpart European Application No. 18935247.9.

* cited by examiner

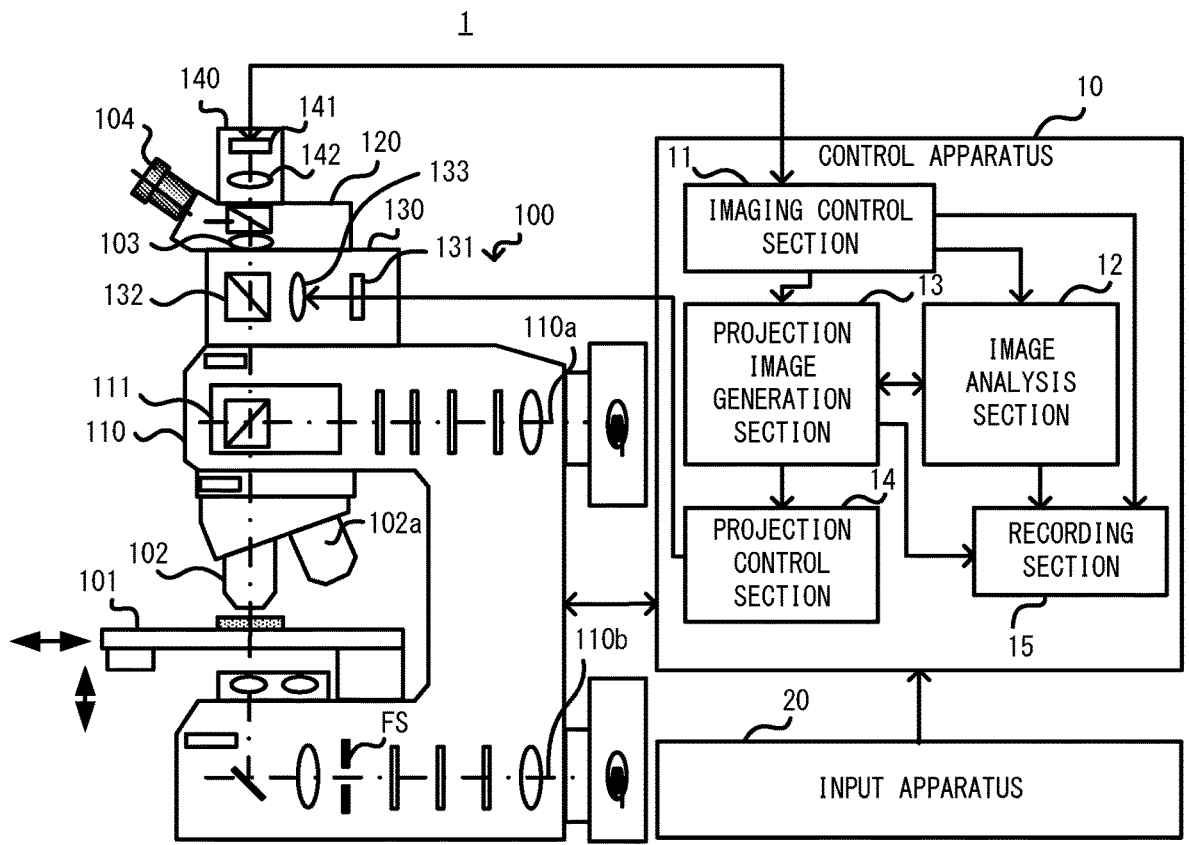
F I G. 1

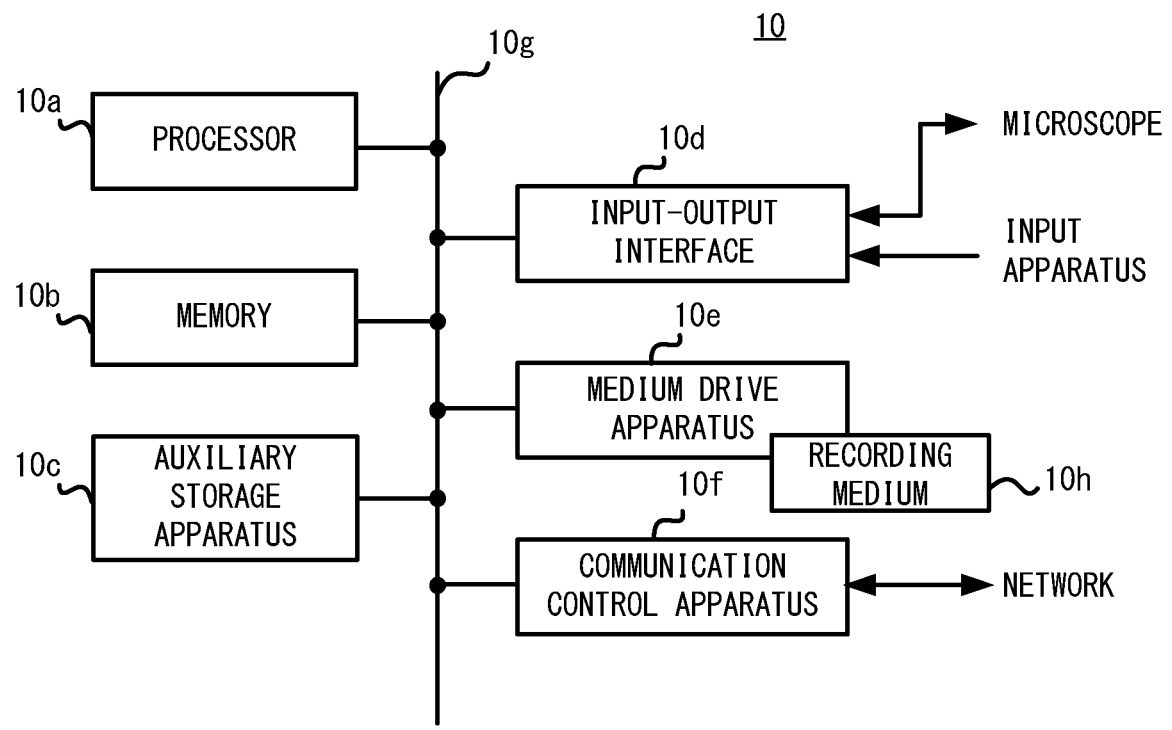
F I G. 2

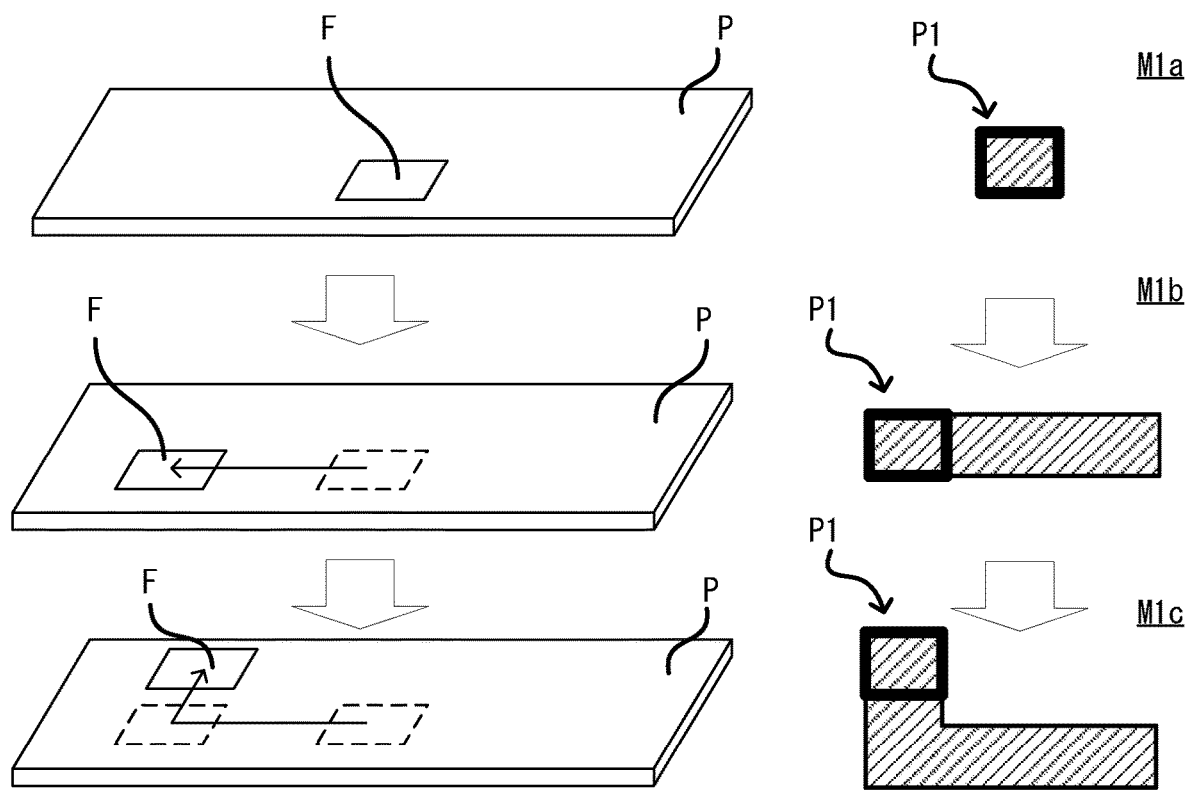
F I G. 7

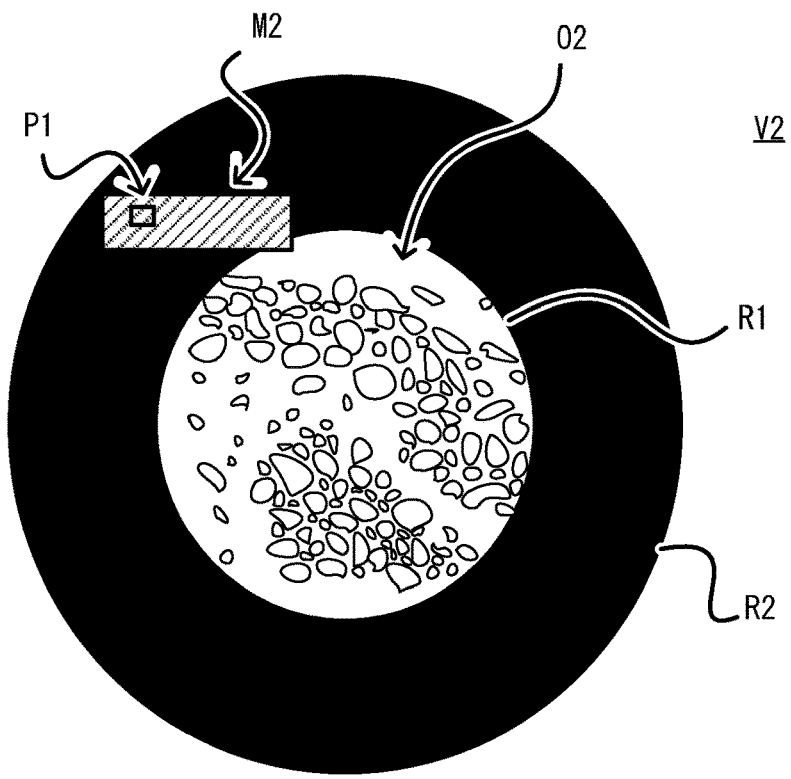
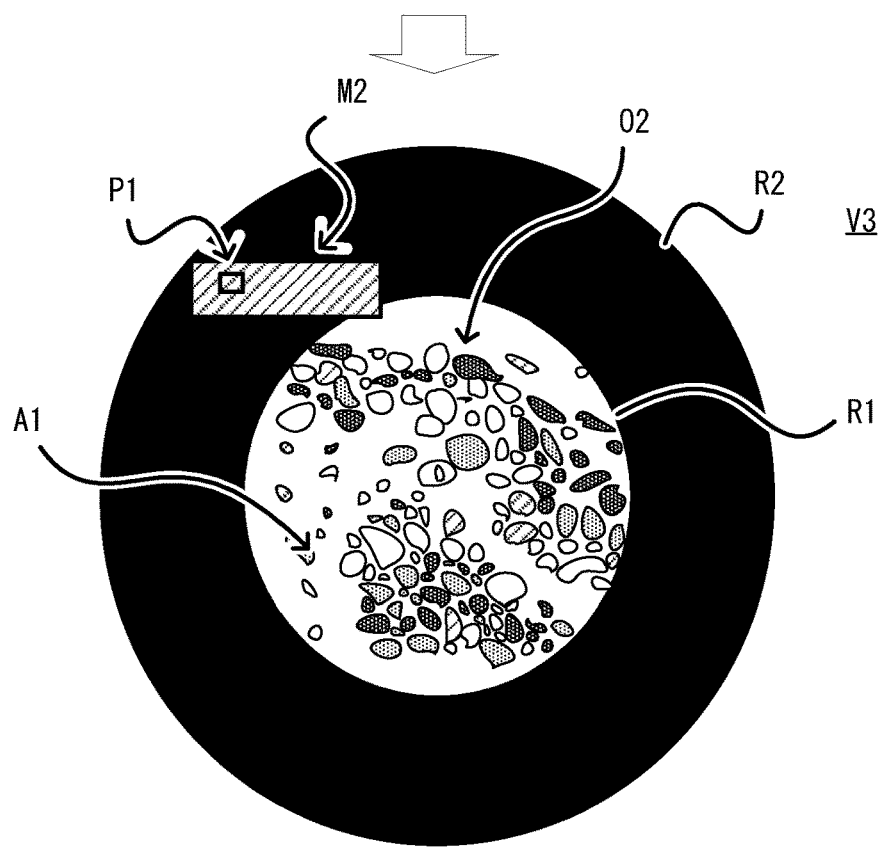
FIG. 11

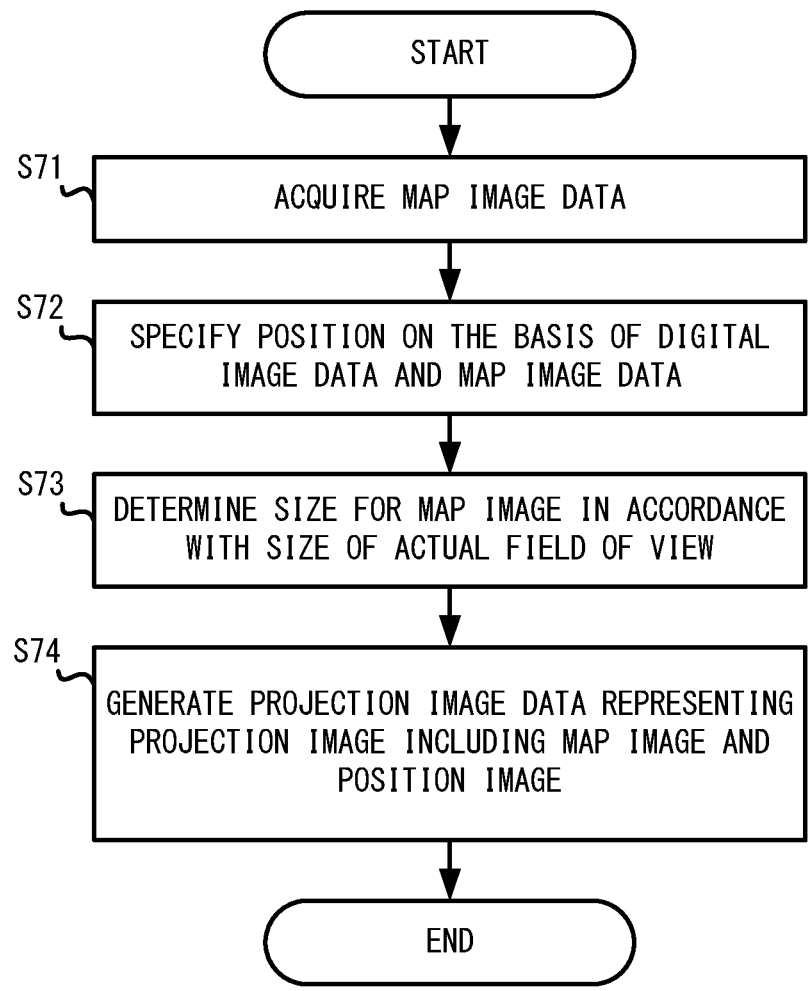
F I G. 15

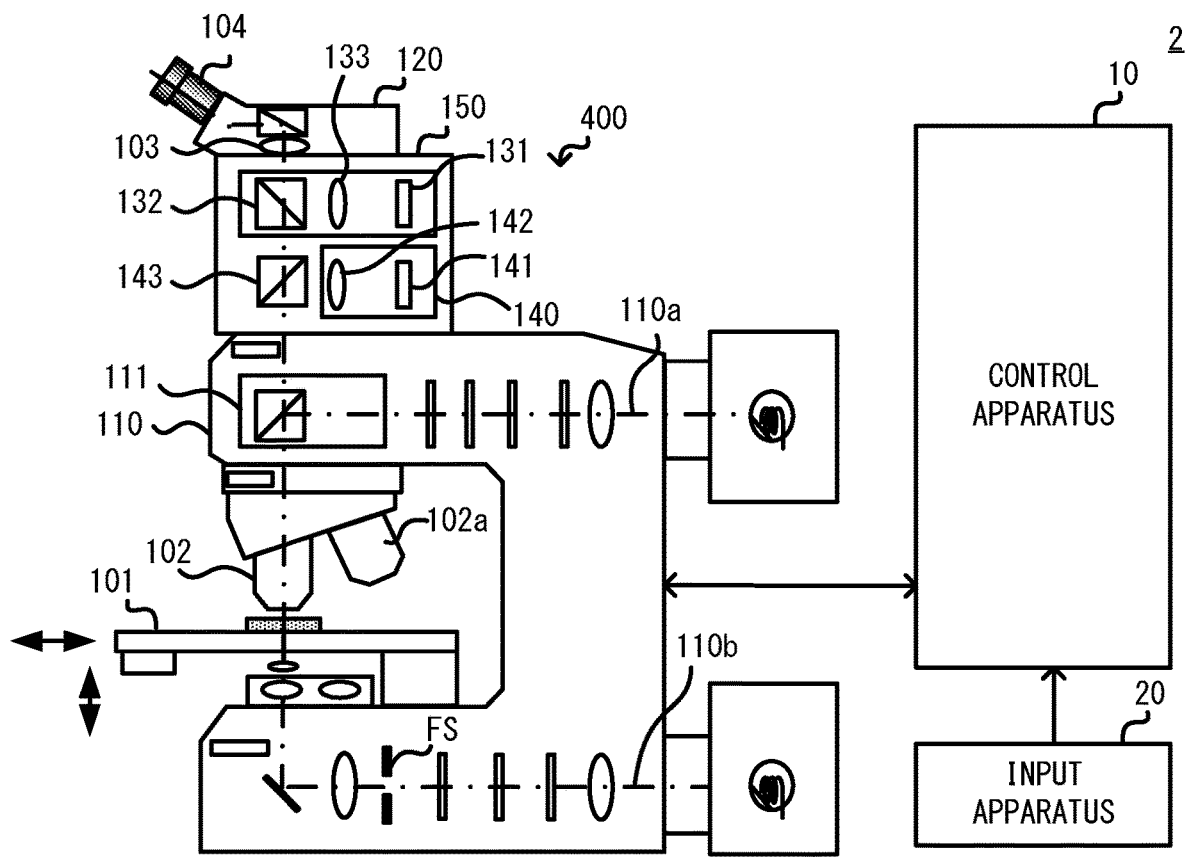
F I G. 1 9

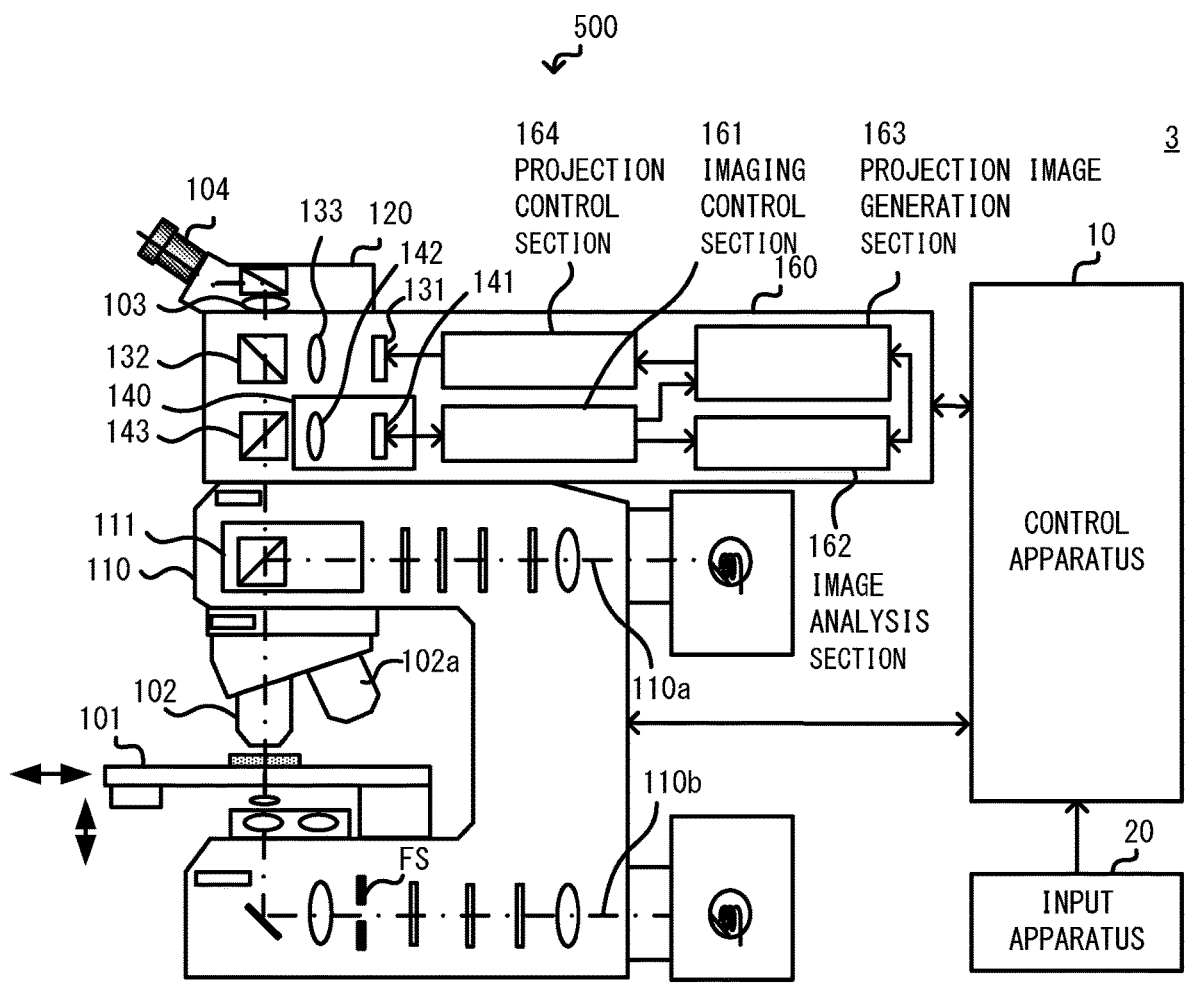
F I G. 2 0

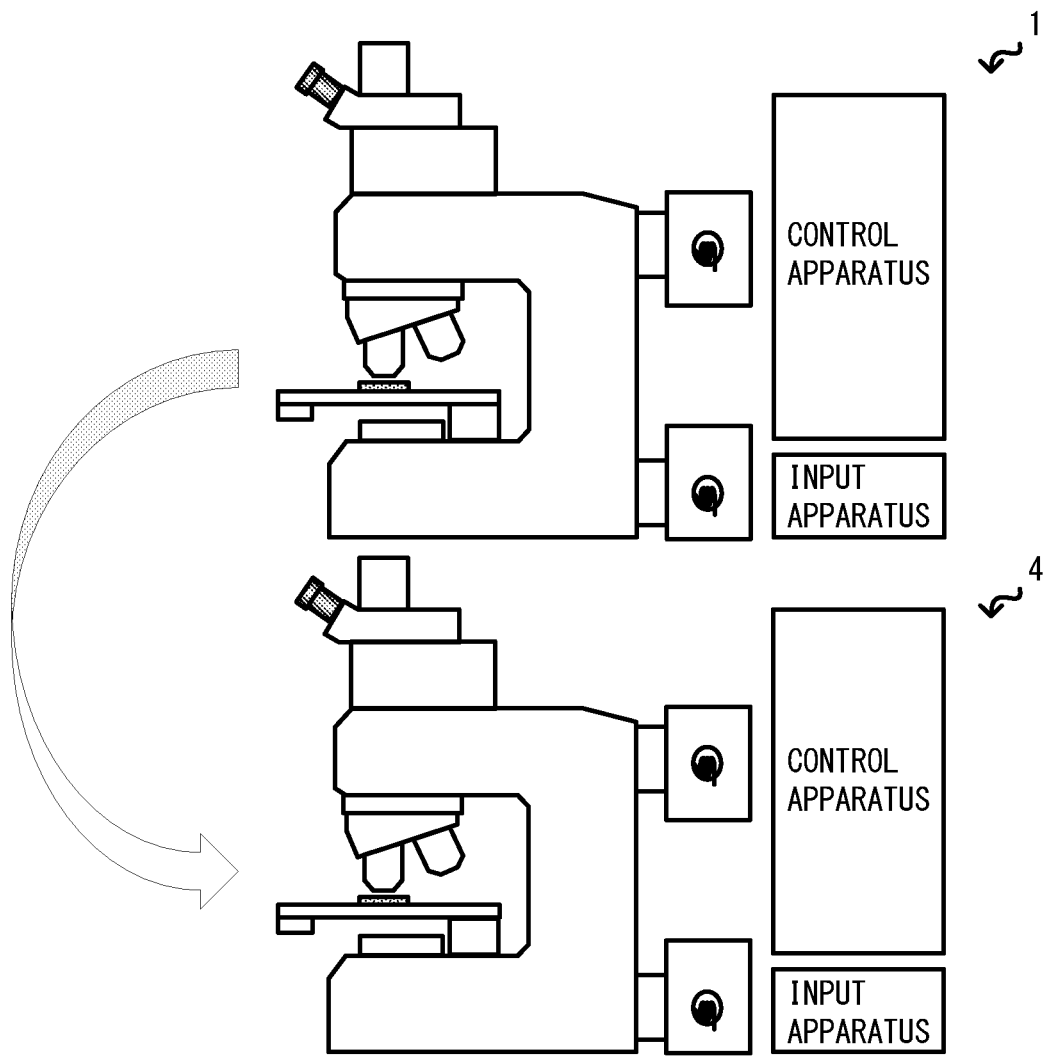
F I G. 2 1

MICROSCOPE SYSTEM, PROJECTION UNIT, AND IMAGE PROJECTION METHOD

CROSS REFERENCE TO RELATED APPLICATIONS

This application is based upon and claims the benefit of priority of the prior Japanese Patent Application No. 2018-183762, filed Sep. 28, 2018, the entire contents of which are incorporated herein by reference.

This is a Continuation Application of PCT Application No. PCT/JP2018/047498, filed Dec. 25, 2018, which was not published under PCT Article 21(2) in English.

BACKGROUND OF THE INVENTION

Field of the Invention

The disclosures herein relate to a microscope system, a projection unit, and an image projection method.

Description of the Related Art

The whole slide imaging (WSI) technique has attracted attention as a technique for reducing the burden on pathologists in pathological diagnoses. The WSI technique is a technique for creating a digital image of the entire area of a specimen on slide glass. The WSI technique is described in, for example, Japanese National Publication of International Patent Application No. 2001-519944.

Techniques for imaging a region wider than the field of view of a microscope with a high revolving power by tiling a plurality of images, such as the WSI technique, have been used for industrial applications. For example, an example thereof may be an application of inspecting and evaluating the microstructures of materials for industrial parts so as to implement quality management.

The above techniques allow any region on an object to be observed while viewing a high-resolution image displayed on a monitor. Thus, the burden on operators performing diagnosis, inspection, evaluation, or the like can be reduced.

SUMMARY OF THE INVENTION

A microscope system in accordance with an aspect of the present invention includes: an eyepiece; an objective that guides light from a sample to the eyepiece; a tube lens that is disposed on a light path between the eyepiece and the objective and forms an optical image of the sample on the basis of light therefrom; a projection apparatus that projects a projection image including a first assistance image onto an image plane on which the optical image is formed; and processor that performs processes. The processes include generating projection image data representing the projection image. The first assistance image is an image of the sample in which a region wider than an actual field of view corresponding to the optical image is seen. The first assistance image is projected onto a portion of the image plane that is close to an outer edge of the optical image.

A projection unit in accordance with an aspect of the invention is a projection unit for a microscope provided with an objective, a tube lens, and an eyepiece, the projection unit including: an imaging apparatus that acquires digital image data of the sample on the basis of light therefrom; a projection apparatus that projects a projection image including a first assistance image onto an image plane on which the optical image is formed; and a processor that performs processes. The processes include generating a projection image data representing the projection image. The first assistance image is an image of the sample in which a region wider than an actual field of view corresponding to the optical image is seen. The first assistance image is projected onto a portion of the image plane that is close to an outer edge of the optical image.

An image projection method in accordance with an aspect of the invention is an image projection method implemented by a microscope system, the image projection method including performing, by the microscope system: generating projection image data representing a projection image including a first assistance image, the first assistance image being an image of a sample in which a region wider than an actual field of view corresponding to an optical image of the sample is seen; and projecting the projection image onto an image plane on which the optical image is formed on the basis of light from the sample.

BRIEF DESCRIPTION OF THE DRAWINGS

FIG. 1 illustrates the configuration of a microscope system 1;

FIG. 2 illustrates the configuration of a control apparatus 10;

FIG. 7 is an explanatory diagram for an example of a process of constructing a map image;

FIG. 11 illustrates other examples of images each viewed through an eyepiece 104 in a microscope system 1;

FIG. 15 is yet another example of a flowchart of a projection image data generation process performed by a microscope system 1;

FIG. 19 illustrates the configuration of a microscope system 2;

FIG. 20 illustrates the configuration of a microscope system 3;

FIG. 21 illustrates a plurality of systems having field of views different in size.

DESCRIPTION OF EMBODIMENTS

Figure 3:
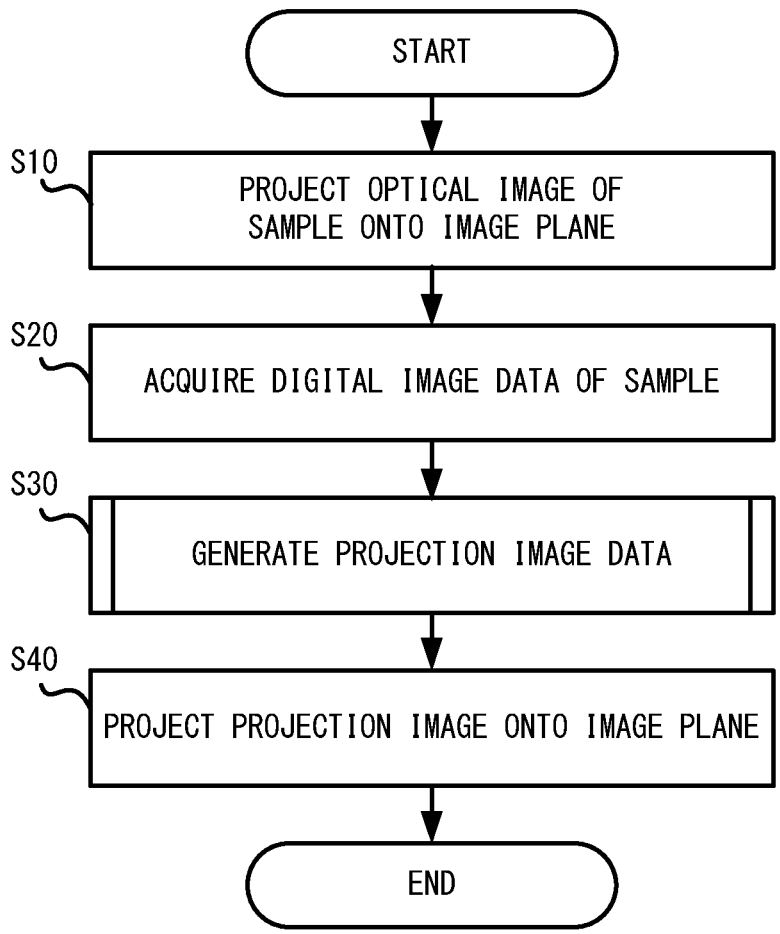
FIG. 3 is an example of a flowchart of an image projection process performed by a microscope system 1.

There is still a need to visually confirm an optical image of a sample by looking through an eyepiece. This is because a digital image is, as a general rule, inferior to an optical image in terms of color reproducibility and dynamic range. In pathological diagnoses, for example, there may be a need to perform diagnoses by using optical images, as information on colors and light and shade is highly important. Meanwhile, a microscope system will be very expensive when digital images are required to have a high color reproducibility and a wide dynamic range comparable to optical images. Thus, only limited users can introduce such a microscope system.

It is an object in one feature of the present invention to provide a new technique for reducing the burden on an operator by assisting in a task such as diagnosis, inspection, or evaluation performed on the basis of optical images acquired by an optical microscope.

Considering such circumstances, an embodiment of the present invention will be described hereinafter.

First Embodiment

FIG. 1 illustrates the configuration of a microscope system 1 in accordance with the present embodiment. FIG. 2 illustrates the configuration of a control apparatus 10. The microscope system 1 is used to observe a sample by looking through an eyepiece 104 and includes at least an objective 102, a tube lens 103, the eyepiece 104, a projection image generation section 13, and a projection apparatus 131. The following descriptions are based on an exemplary situation in which a pathologist uses the microscope system 1 for a pathological diagnosis, but the microscope system 1 is not limited to this application.

Using the projection apparatus 131, the microscope system 1 projects a projection image onto an image plane on which an optical image of a sample is formed by the objective 102 and the tube lens 103. The projection image includes an image of the sample in which a region wider than the actual field of view corresponding to an optical image is seen. Thus, the user of the microscope system 1 can make a detailed observation of a portion of the sample by means of an optical image while roughly grasping a wider range on the sample. Hence, the microscope system 1 can assist in a task performed by the user while observing the sample by means of an optical image.

The following describes a specific example of the configuration of the microscope system 1 in detail by referring to FIGS. 1 and 2. As depicted in FIG. 1, the microscope system 1 includes a microscope 100, the control apparatus 10, and an input apparatus 20. The microscope system 1 may further include a display apparatus and the like.

For example, the microscope 100 may be an upright microscope and include a microscope body 110, a tube 120, an intermediate tube 130, and an imaging apparatus 140. Alternatively, the microscope 100 may be an inverted microscope.

The microscope body 110 includes a stage 101 on which a sample is placed, objectives (objectives 102 and 102a) that guide light from the sample to the eyepiece 104, an epi-illumination optical system, and a transmitted illumination optical system provided with a field stop FS. The stage 101 may be a manual stage or a motorized stage. A revolver is desirably mounted with a plurality of objectives having different magnifications. For example, the objective 102 may have a 4-fold magnification, and the objective 102a may have a 20-fold magnification. The microscope body 110 may include at least either an epi-illumination optical system or a transmitted illumination optical system. In this example, the transmitted illumination optical system is provided with the field stop FS. However, the epi-illumination optical system may be provided with a field stop. Meanwhile, the epi-illumination optical system may include a relay optical system (not illustrated) between the objective 102 and a light deflection element 132 (described hereinafter). The field stop may be provided at the position of an intermediate image to be formed by the relay optical system.

The microscope body 110 further includes a turret 111 for switching a microscopy. For example, the turret 111 may have disposed thereon a fluorescence cube to be used in a fluorescent observation method or a half mirror to be used in a bright field observation method. In addition, the microscope body 110 may be provided with an optical element to be used in a certain microscopy, in a manner such that this optical element can be inserted/removed into/from a light path. Specifically, for example, the microscope body 110 may include a DIC prism, polarizer, and analyzer to be used in a differential-interference-contrast observation method.

The tube 120 is a trinocular tube mounted with the eyepiece 104 and the imaging apparatus 140. The tube lens 103 is provided within the tube 120. The tube lens 103 is disposed on a light path between the objective 102 and the eyepiece 104. On the basis of light from a sample, the tube lens 103 forms an optical image of the sample on an image plane between the eyepiece 104 and the tube lens 103. On the basis of light from the sample, the tube lens 103 also forms an optical image of the sample on an image plane between the image sensor 141 and the tube lens 103. The tube lens 103 also forms projection images on the image planes on the basis of light from the projection apparatus 131 (descriptions will be given of the projection images hereinafter). Thus, projection images are superimposed onto the optical images on the image planes, so that the user of the microscope system 1 can see a superimposition image obtained by superimposing a projection image onto an optical image by looking through the eyepiece 104.

The tube lens 103 has a function for varying the focal length without changing the positions of the image planes, a function for changing the positions of the image planes without changing the focal length, or a function for varying the positions of the image planes and the focal length independently from each other. The features implementing these functions include a lens that moves at least some of the lenses in the tube lens 103 in the optical-axis direction. These features also include an active lens that varies at least either the radius of curvature or refractive index of at least some of the lenses of the optical system forming the tube lens 103 by electrically controlling these lenses. For example, the active lens may be a liquid lens.

The intermediate tube 130 is provided between the microscope body 110 and the tube 120. The intermediate tube 130 includes the projection apparatus 131, a light deflection element 132, and the projection lens 133.

In accordance with an instruction from the control apparatus 10, the projection apparatus 131 projects a projection image onto an image plane on which an optical image is formed. For example, the projection apparatus 131 may be a projector using a liquid crystal device, a projector using a digital mirror device, or a projector using an LCOS.

The light deflection element 132 deflects light emitted from the projection apparatus 131 toward an image plane. For example, the light deflection element 132 may be a beam splitter such as a half mirror. A variable beam splitter capable of varying transmittance and reflectance may be used for the light deflection element 132. A dichroic mirror may be used for the light deflection element 132. The light deflection element 132 is disposed on the light path between the objective 102 and the tube lens 103.

The projection lens 133 guides light from the projection apparatus 131 to the tube lens 103. The magnification of a projection image projected onto an image plane is adjusted in accordance with the focal length of the projection lens 133. As in the case of the tube lens 103, a lens having a function for varying at least either the positions of the image planes or the focal length, e.g., an active lens, may be used for the projection lens 133.

For example, the imaging apparatus 140 may be a digital camera and include the image sensor 141 and an adapter lens 142. The imaging apparatus 140 acquires digital image data of a sample on the basis of light therefrom.

The image sensor 141 is an example of a photodetector that detects light from a sample. The image sensor 141 is a two-dimensional image sensor, e.g., CCD image sensor, CMOS image sensor. The image sensor 141 detects light from a sample and converts the same into an electric signal. The adapter lens 142 projects an optical image formed on the image plane onto the image sensor 141.

When the projection apparatus 131 projects a projection image onto the image plane, light from the projection apparatus 131 is also incident on the imaging apparatus 140. Thus, a digital image acquired by the imaging apparatus 140 could include an optical image of a sample as well as a projection image. However, the projection period of the projection apparatus 131 and the exposure period of the imaging apparatus 140 may be adjusted so that the imaging apparatus 140 can acquire digital image data of a sample that does not include a projection image.

The input apparatus 20 outputs, to the control apparatus 10, an operation signal that corresponds to an input operation performed by the user. The input apparatus 20 is, for example, a keyboard and may include a mouse, a joystick, or a touch panel. Alternatively, the input apparatus 20 may be an apparatus that receives voice input, e.g., a microphone. In this case, the control apparatus 10 may have a function for recognizing a voice instruction input via the input apparatus 20.

The control apparatus 10 controls the entirety of the microscope system 1. The control apparatus 10 is connected to the microscope 100 and the input apparatus 20. As depicted in FIG. 1, the control apparatus 10 includes an imaging control section 11, an image analysis section 12, a projection image generation section 13, a projection control section 14, and a recording section 15 as components pertaining primarily to the controlling of the projection apparatus 131.

The imaging control section 11 controls the imaging apparatus 140 so as to acquire digital image data of a sample. The digital image data acquired by the imaging control section 11 is output to the image analysis section 12, the projection image generation section 13, and the recording section 15.

The image analysis section 12 analyzes digital image data acquired by the imaging control section 11 and outputs an analysis result to the projection image generation section 13. Details of the analysis process performed by the image analysis section 12 are not particularly limited.

For example, the image analysis section 12 may specify, on the basis of digital image data acquired by the image sensor 141 and map image data (described hereinafter), a position corresponding to an optical image within a map image projected onto the image plane, and output corresponding position information to the projection image generation section 13.

More specifically, the image analysis section 12 specifies the above position by comparing the map image with the digital image. The image analysis section 12 may perform the process of specifying a position according to image comparison every time digital image data is acquired. Once the position is specified according to image comparison, a relationship is established between the coordinate information included in the map image and the coordinate information managed by the microscope system 1. Thus, after this, the image analysis section 12 may update the position on the basis of the coordinate information in the map image and the movement amount of the sample without comparing the map image with a digital image.

For example, the movement amount of a sample may be calculated on the basis of a plurality of pieces of digital image data acquired at different times. In particular, for example, image analysis can be performed for pieces of digital image data acquired at different times so as to calculate the movement amount of a subject seen in the digital image data. Alternatively, digital images acquired at different times may each be compared with a map image so as to determine coordinates in the images with reference to the map image, and the movement amount can be calculated from the coordinates. In this case, the movement amount can be calculated even when there is no overlap in space between digital images represented by pieces of digital image data acquired at different times. When the stage 101 is a motorized stage, the movement amount may be calculated on the basis of control information of the motorized stage. For example, the control information of the motorized stage may be information pertaining to a movement instruction output by the control apparatus 10 to the stage 101 or may be information pertaining to a movement result output from the stage 101 to the control apparatus 10. Note that the information pertaining to a movement result is, for example, output information from an encoder provided on the stage 101.

For example, the image analysis section 12 may classify one or more structures seen in a digital image represented by digital image data into one or more classes and output an analysis result including information specifying the position of a structure classified into at least one class of the one or more classes. More specifically, the image analysis section 12 may classify the cells seen in a digital image according to the staining intensities and generate an analysis result including class information indicating the classes of the cells and position information specifying the outlines of the cells or the outlines of the nuclei of the cells. In this case, a structure classified into at least one class is desirably an object that serves as a basis for a judgment to be made by the pathologist in a pathological diagnosis.

For example, the image analysis section 12 may track a region of interest within a sample on the basis of digital image data. In this case, an analysis result output by the image analysis section 12 desirably includes position information of the region of interest and tracking result information indicating success or failure of tracking. A region of interest to be tracked may be determined by analyzing digital image data or may be determined by a user designating the same using the input apparatus 20.

The projection image generation section 13 generates projection image data. The projection image data generated by the projection image generation section 13 is output to the projection control section 14 and the recording section 15. A projection image represented by the projection image data includes a map image. The map image is an example of a first assistance image. The map image is an image of a sample in which a region wider than the actual field of view corresponding to an optical image formed on the image plane is seen. Hence, a map image may be, for example, an image of a sample acquired using an objective having a lower magnification than the objective 102. Alternatively, a map image may be an image such as a whole slide image generated by tiling a plurality of images. In this case, the plurality of images are each an image in which a different portion of a region on the sample that is wider than the actual field of view is seen. The following descriptions are given by referring to an example pertaining to a map image generated by tiling a plurality of images.

Map image data included in projection image data generated by the projection image generation section 13 may be image data generated by a system different from the microscope system 1. The projection image generation section 13 may generate projection image data by using map image data acquired by another system. The projection image generation section 13 may also generate map image data on the basis of a plurality of pieces of digital image data of a sample acquired by the imaging apparatus 140. Note that map image data is an example of a first assistance image data and represents a map image.

A projection image may include another image in addition to a map image. For example, the projection image may include a position image indicating a position within the map image that corresponds to an optical image. The position image is an example of a second assistance image. The projection image generation section 13 may generate position image data on the basis of position information output from the image analysis section 12 that corresponds to the optical image within the map image, and thus generate projection image data representing a projection image including both the map image and the position image. Note that position image data refers to image data representing a position image.

A projection image may include an analysis image indicating an analysis result provided by the image analysis section 12. The analysis image is an example of a third assistance image. The projection image generation section 13 may generate analysis image data on the basis of class information and position information output from the image analysis section 12, and thus generate projection image data representing a projection image that includes a map image and an analysis image indicating the analysis result. Note that analysis image data refers to image data representing an analysis image.

A projection image may include an analysis image indicating a tracking result provided by the image analysis section 12. The analysis image is an example of a fourth assistance image and indicates, for example, success or failure of the tracking of a region of interest. The projection image generation section 13 may generate analysis image data on the basis of tracking result information output for the region of interest from the image analysis section 12, and thus generate projection image data representing a projection image that includes a map image and an analysis image indicating the tracking result.

The projection control section 14 controls projection of a projection image onto the image plane by controlling the projection apparatus 131. For example, the projection control section 14 may control the projection apparatus 131 in accordance with the setting of the microscope system 1. Specifically, the projection control section 14 may determine whether to project a projection image onto the image plane in accordance with the setting of the microscope system 1, or may control the projection apparatus 131 such that the projection apparatus 131 projects a projection image onto the image plane when the microscope system 1 is in a predetermined setting. Thus, the microscope system 1 can make a change as to whether to project a projection image onto the image plane in accordance with the setting.

For example, the projection control section 14 may control the projection apparatus 131 such that the light emission period of the projection apparatus 131 and the exposure period of the image sensor 141 have no overlap therebetween. In this way, a projection image can be prevented from being seen on a digital image.

The recording section 15 records digital image data. The recording section 15 may record digital image data when detecting input of a record instruction from the user. When the microscope system 1 has detected a predetermined event, the recording section 15 may record, in response to the event, information corresponding to the event together with digital image data. For example, when a cancer cell is detected on the basis of an analysis result provided by the image analysis section 12, the recording section 15 may record position information and digital image data of the cancer cell. The recording section 15 may further record map image data, an analysis result, and coordinate information.

The control apparatus 10 may be a general-purpose or special-purpose apparatus. For example, the control apparatus 10 may have, but is not particularly limited to, a physical configuration such as that depicted in FIG. 2. Specifically, the control apparatus 10 may include a processor 10*a*, a memory 10*b*, an auxiliary storage apparatus 10*c*, an input-output interface 10*d*, a medium drive apparatus 10*e*, and a communication control apparatus 10*f*, all of which may be connected to each other by a bus 10*g*.

For example, the processor 10*a* may be any processing circuit that includes a central processing unit (CPU). The processor 10*a* may implement the above-described components pertaining to the controlling of the projection apparatus 131 (e.g., imaging control section 11, image analysis section 12, projection image generation section 13) by performing programmed processes by executing programs stored in the memory 10*b*, the auxiliary storage apparatus 10*c*, or a storage medium 10*h*. The processor 10*a* may be configured using a special-purpose processor such as an ASIC or an FPGA.

The memory 10*b* is a working memory for the processor 10*a*. For example, the memory 10*b* may be any semiconductor memory such as a random access memory (RAM). The auxiliary storage apparatus 10C is a nonvolatile memory such as an erasable programmable ROM (EPROM) or a hard disc drive. The input-output interface 10*d* communicates information with an external apparatus (microscope 100, input apparatus 20).

The medium drive apparatus 10*e* can output data stored in the memory 10*b* or the auxiliary storage apparatus 10*c* to the storage medium 10*h* and read a program, data, and the like from the storage medium 10*h*. The storage medium 10*h* may be any portable recording medium. For example, the storage medium 10*h* may include an SD card, a universal serial bus (USB) flash memory, a compact disc (CD), and a digital versatile disc (DVD).

The communication control apparatus 10f inputs/outputs information to/from a network. For example, a network interface card (NIC) or a wireless local area network (wireless LAN) card may be used as the communication control apparatus 10f. The bus 10g connects the processor 10a, the memory 10b, the auxiliary storage apparatus 10c, and the like to each other in a manner such that data can be communicated therebetween.

Figure 4:
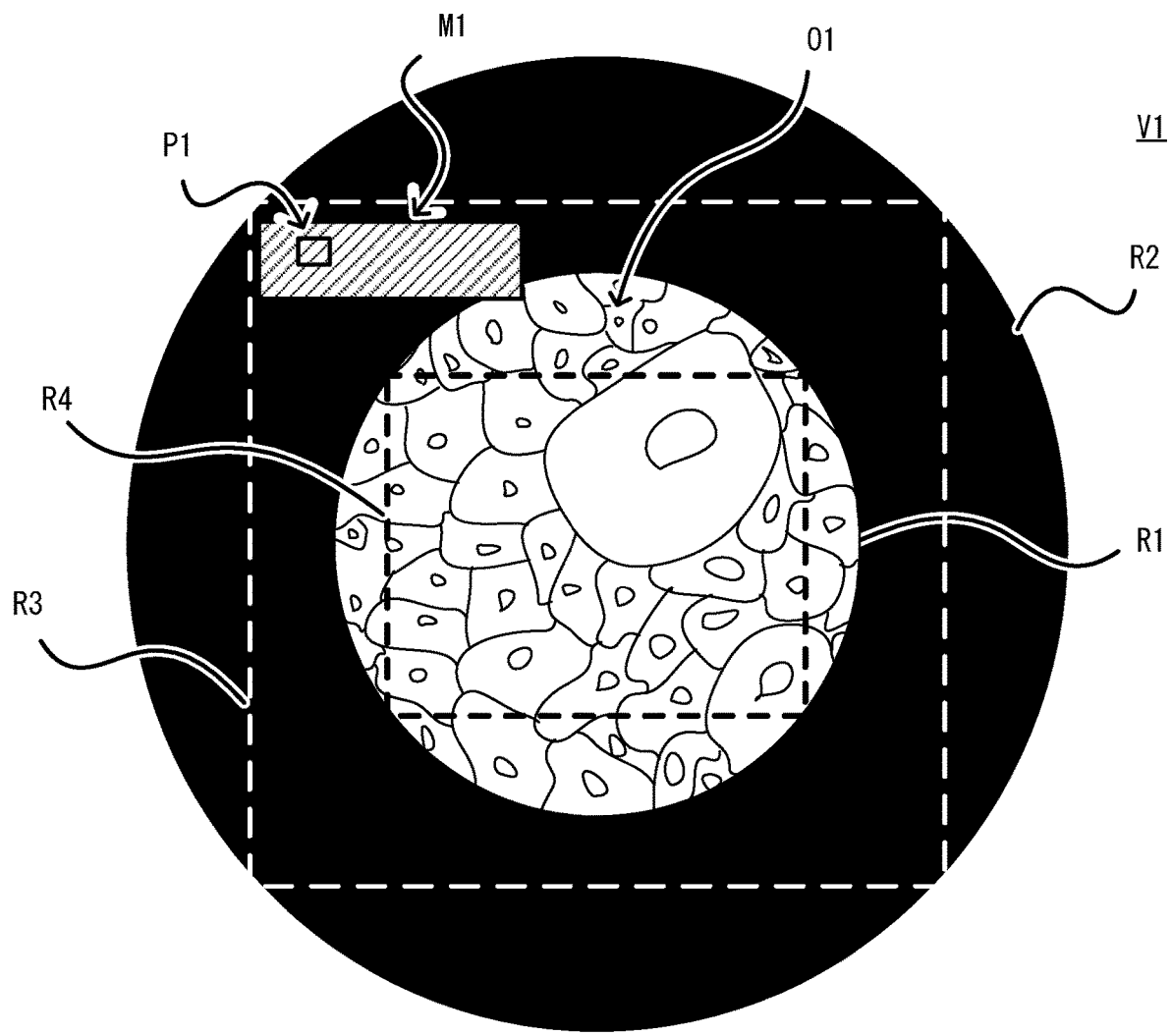
FIG. 4 illustrates an example of an image viewed through an eyepiece 104 in a microscope system 1.
Figure 5:
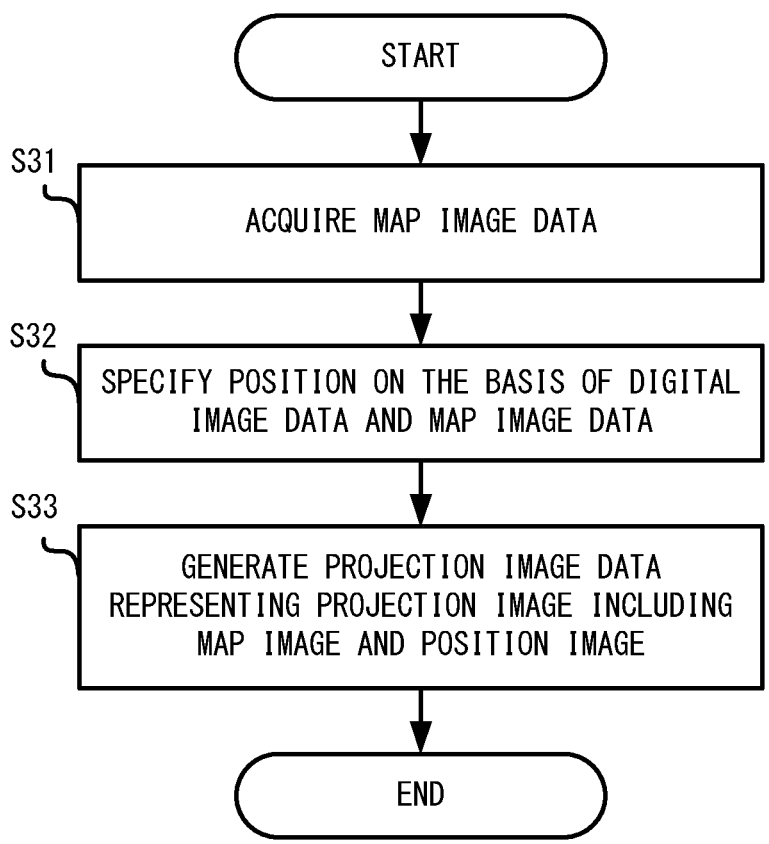
FIG. 5 is an example of a flowchart of a projection image data generation process performed by a microscope system 1.
Figure 6:
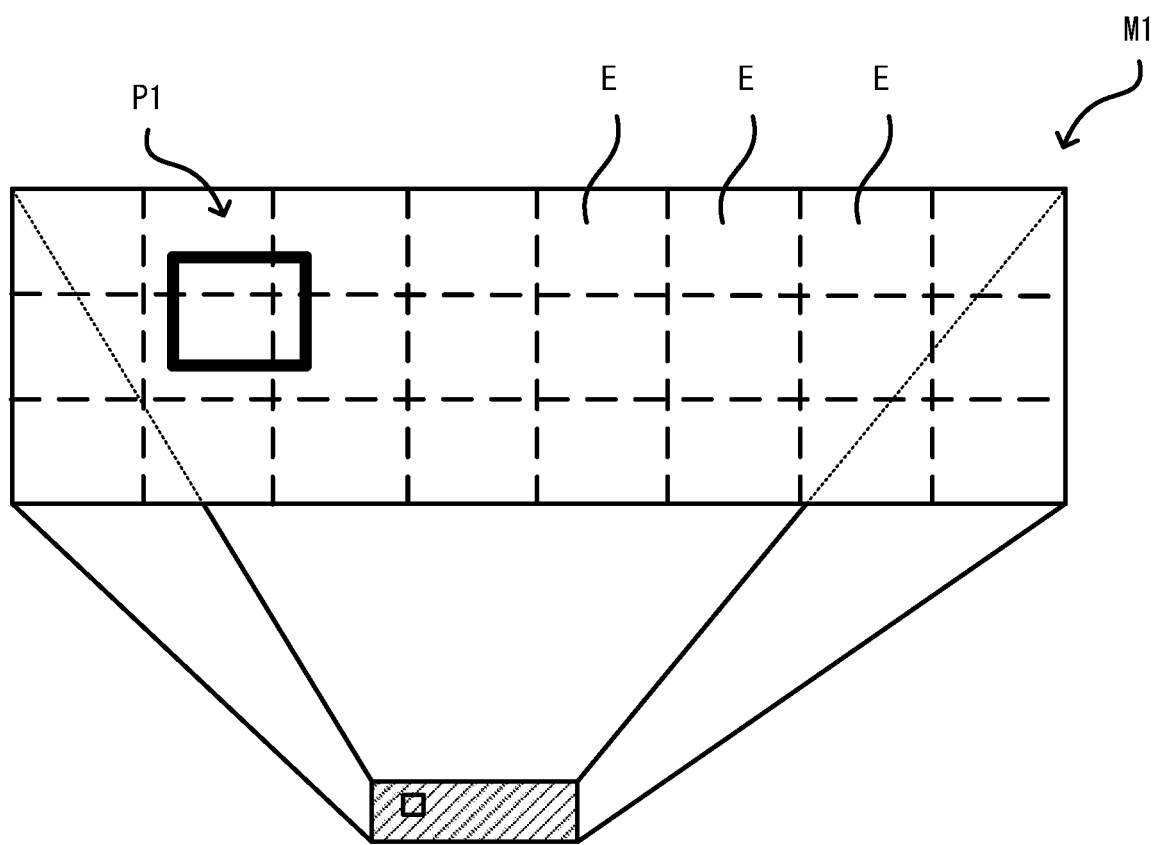
FIG. 6 is an explanatory diagram for a map image M1.

The microscope system 1 configured as described above performs an image projection process depicted in FIG. 3. FIG. 3 is a flowchart of an image projection process performed by the microscope system 1. FIG. 4 illustrates an example of an image viewed through the eyepiece 104 in the microscope system 1. FIG. 5 is an example of a flowchart of a projection image data generation process performed by the microscope system 1. FIG. 6 is an explanatory diagram for a map image M1. The following describes an image projection method implemented by the microscope system 1 by referring to FIGS. 3-6.

First, the microscope system 1 projects an optical image of a sample onto an image plane (step S10). In this example, the tube lens 103 focuses light that the objective 102 receives from the sample onto the image plane, thereby forming an optical image of the sample. Thus, as indicated in FIG. 4, an optical image O1 is projected onto a region R1 on the image plane. Note that the region R1 indicates a region on the image plane on which a pencil of light from the objective 102 is incident. Meanwhile, a region R2 indicates a region on the image plane that can be viewed by looking through the eyepiece 104.

Next, the microscope system 1 acquires digital image data of the sample (step S20). In this example, the imaging apparatus 140 generates digital image data by imaging the sample on the basis of light therefrom. The image sensor 141 has a rectangular shape, and hence the region on the sample that corresponds to the digital image does not completely match the region on the sample that corresponds to the optical image, i.e., not completely match the actual field of view. A region R4 indicates the region on the image plane that corresponds to the region on the sample that can be imaged by the imaging apparatus 140. Although the entirety of the region R4 is located within the region R1 in FIG. 4, the region R4 may include a portion located outside the region R1. However, the central position on the region R1 desirably coincides with the central position on the region R4.

A field stop may be disposed at a position conjugate to an observation plane on the sample so as to make the boundary on the circumference of the region R1 clearer. For example, a field stop may desirably be disposed at a position on an epi-illumination light path 110a or a transmitted illumination light path 110b in the microscope body 110 that is conjugate to the observation plane. In the case of a fluorescent observation, fluorescence from a sample is generated in every direction even when a pencil of light is limited on the illumination light path. Thus, it will be desirable to provide a relay optical system for generating an intermediate image between the objective 102 and the light deflection element 132, which is located at a position at which the light path from the projection apparatus 131 and the light path from the objective 102 meet, and dispose a field stop at the intermediate image position.

Then, the microscope system 1 generates projection image data (step S30). In this example, the microscope system performs the projection image data generation process depicted in FIG. 5.

Upon the projection image data generation process being started, the projection image generation section 13 in the microscope system 1 first acquires map image data (step S31). For example, the projection image generation section 13 may acquire map image data generated in advance from the auxiliary storage apparatus 10c. A map image M1 represented by the map image data is an image obtained by tiling a plurality of component images E, as indicated in FIG. 6.

Then, the microscope system 1 specifies a position on the basis of the digital image data and the map image data (step S32). In this example, the image analysis section 12 compares the digital image with the map image so as to specify a position on the map image that corresponds to the optical image, and outputs position information to the projection image generation section 13.

Upon a position being specified, the microscope system 1 generates projection image data representing a projection image including the map image and a position image (step S33). In this example, the projection image generation section 13 generates position image data on the basis of the position information output from the image analysis section 12. Then, the position image data and the map image data are composited to generate projection image data representing a projection image including the map image and the position image. For example, as depicted in FIG. 6, a position image P1 may be a rectangular mark indicating a position on a map image that corresponds to an optical image.

Upon the projection image data generation process being finished, the microscope system 1 projects the projection image onto the image plane (step S40). In this example, the projection control section 14 controls the projection apparatus 131 on the basis of the projection image data generated in step S33, thereby causing the projection apparatus 131 to project the projection image onto the image plane. More specifically, as indicated in FIG. 4, the projection apparatus 131 projects the position image P1 onto a position within the map image M1 that corresponds to the optical image O1. As a result, an image obtained by superimposing the projection image (map image M1, position image P1) onto the optical image O1 is formed on the image plane. A region R3 depicted in FIG. 4 indicates a region on the image plane onto which an image of the projection apparatus 131 is projected.

The microscope system 1 projects the map image M1 onto the image plane on which the optical image O1 is formed. Thus, the user can make a detailed observation of a portion of the sample by means of the optical image while roughly grasping a wider range on the sample without taking the eye from the eyepiece 104. In addition, as the position image P1 is projected onto the map image M1, the user can easily determine at which position within the sample a currently observed region is located or easily grasp the size of a region under observation with reference to the entire region. Hence, the microscope system 1 can assist in a task performed by the user while observing the sample by means of an optical image. For example, the user can easily determine in which direction or how much the stage should be moved, with the result that the burden of operating the stage of the microscope 100 is reduced.

In addition, expensive devices are not necessary for the microscope system 1, unlike WSI systems which perform pathological diagnoses based on digital images. Hence, the microscope system 1 can reduce the burden on the user with substantial rise in device cost avoided.

Although the above examples are such that projection image data is generated using map image data acquired in advance, map image data may be generated when generating projection image data. For example, the projection image generation section 13 may acquire digital image data every time an imaging region F is moved, as depicted in FIG. 7, on a preparation P, i.e., a sample, and update a map image by generating map image data every time digital image data is acquired. FIG. 7 illustrates that the map image is updated to a map image M1$a$, then to a map image M1$b$, and finally to a map image M1$c$ in accordance with movement of the imaging region F and a position image P1 is superimposed onto a position on each of the map images that corresponds to the imaging region F.

For example, the technique described in Japanese Laid-open Patent Publication No. 2018-54690 may be used when generating a map image while the imaging region F is being moved. In particular, a motion vector between two images may be calculated by performing image analysis in succession for acquired digital image data, and digital image data may be pasted at a current position corresponding to a cumulative motion vector so as to generate or update a map image. When doing so, a map image can be generated using a manual stage without using a motorized stage or an encoder for detecting the stage position, so that a system can be constructed at low cost.

Figure 8:
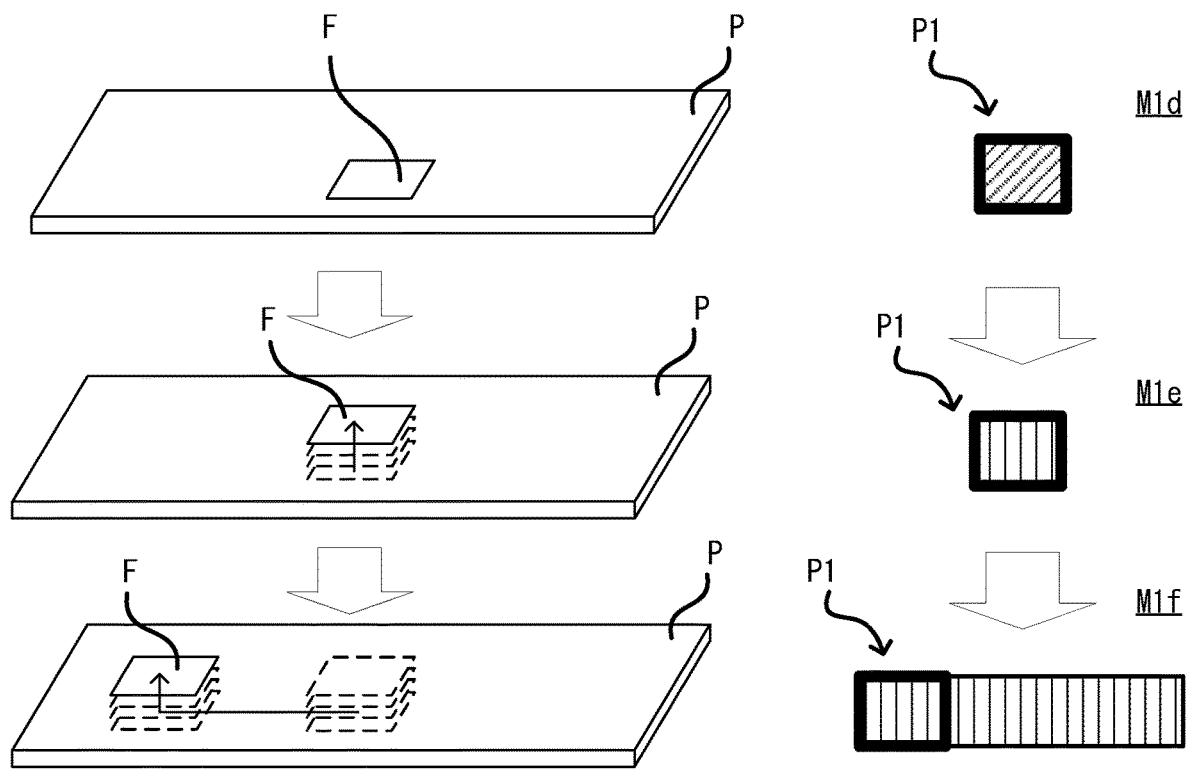
FIG. 8 is an explanatory diagram for another example of a process of constructing a map image.

A plurality of pieces of digital image data to be used to generate map image data may include two or more pieces of digital image data acquired at a plurality of focal positions of the objective 102 that are different in the optical-axis direction of the objective 102. As indicated in FIG. 8, for example, a plurality of pieces of digital image data may be acquired at individual positions in a direction orthogonal to the optical axis by moving the objective 102 or the stage 101 in the optical-axis direction, thereby constructing extended focus images, and the extended focus images may be tiled to construct a map image. Note that map images M1$e$ and M1$f$ among the map images depicted in FIG. 8 (map images M1$d$, M1$e$, and M1$f$) indicate extended focus images.

Figure 9:
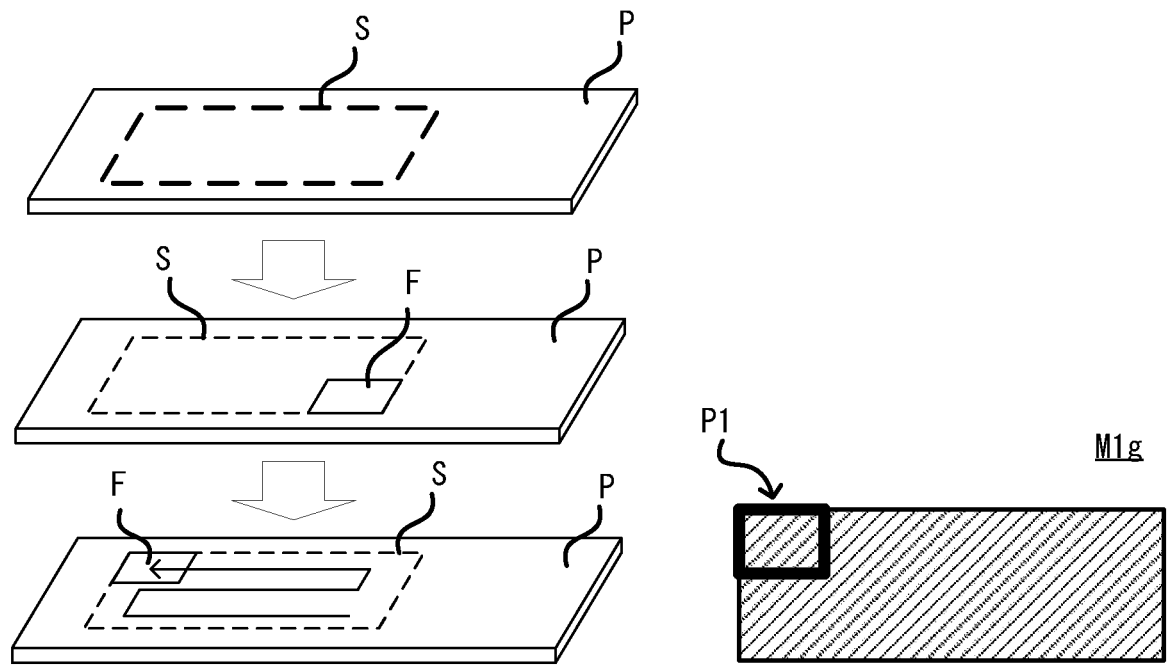
FIG. 9 is an explanatory diagram for still another example of a process of constructing a map image.

In addition, when the stage 101 is a motorized stage, before an observation is started, the microscope system 1 may control the stage 101 so as to automatically scan, as depicted in FIG. 9, a scanning range S designated by the user. After the stage 101 is completely moved, the projection image generation section 13 may generate a map image M1$g$ on the basis of a plurality of pieces of digital image data acquired during the movement.

For example, the method of designating a scanning range S may be one wherein the user designates three portions close to the perimeter of the scanning range S by clicking a mouse while looking through the eyepiece 104. In this case, the microscope system 1 may automatically set a range including the three designated portions as the scanning range.

When map image data is generated, the recording section 15 may record the map image data and coordinate information of digital images represented by a plurality of pieces of digital image data used to generate the map image data. Thus, the map image data has the coordinate information, and hence it will be easy to specify a position onto which a position image is to be projected.

Furthermore, the recording section 15 may record digital image data in addition to map image data. In this case, coordinate information is desirably recorded in association with the digital image data. In addition, when the image analysis section 12 analyzes digital image data, coordinate information may be recorded in association with the analysis result. For example, when the analysis result pertains to the presence/absence of a cancer cell, distribution information of cancer cells within a map image can be acquired.

Figure 10:
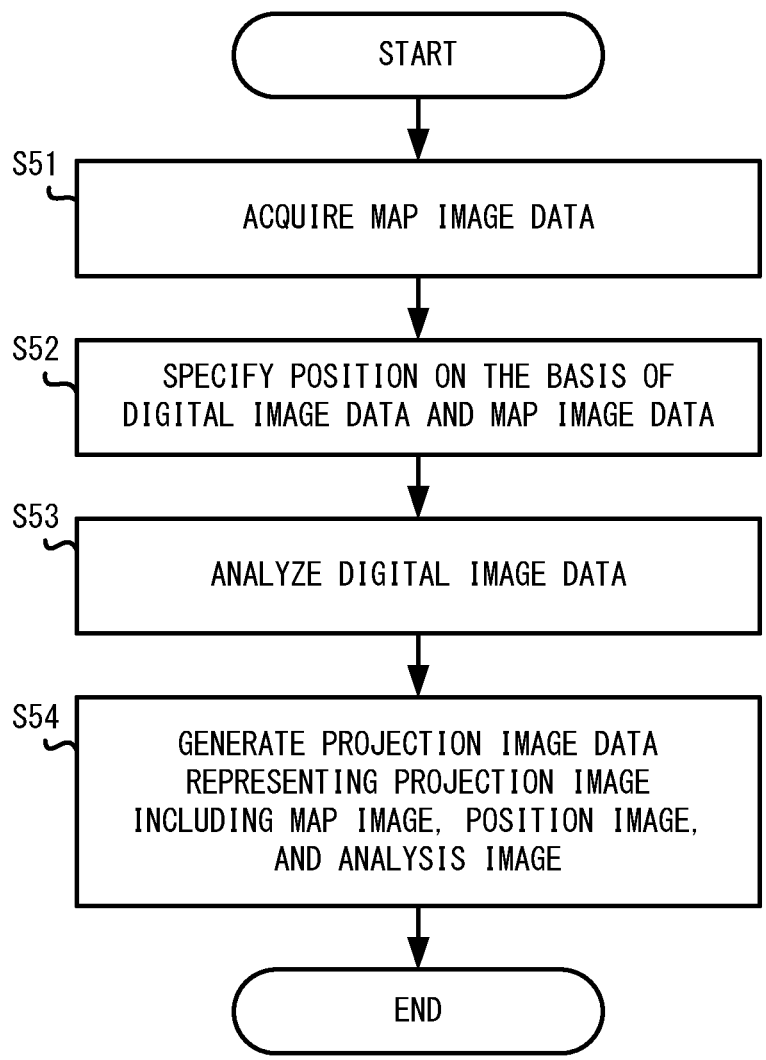
FIG. 10 is another example of a flowchart of a projection image data generation process performed by a microscope system 1.

The microscope system 1 may perform the projection image data generation process depicted in FIG. 10 instead of the projection image data generation process depicted in FIG. 5. FIG. 10 is another example of a flowchart of a projection image data generation process performed by the microscope system 1. FIG. 11 illustrates other examples of images each viewed through the eyepiece 104 in the microscope system 1.

Upon the projection image data generation process depicted in FIG. 10 being started, the microscope system 1 acquires map image data (step S51) and specifies a position on the basis of digital image data and the map image data (step S52). The processes of steps S51 and S52 are similar to those of steps S31 and S32 depicted in FIG. 5.

Then, the microscope system 1 analyzes the digital image data (step S53). In this example, the image analysis section 12 analyzes the digital image data so as to generate, for example, information for assisting in a pathological diagnosis. In particular, cell nuclei are specified through the analysis, and classification is performed in accordance with the staining intensities.

Upon the analysis being finished, the microscope system 1 generates projection image data representing a projection image including a map image, a position image, and an analysis image (step S54). In this example, the projection image generation section 13 generates position image data on the basis of position information output from the image analysis section 12. In addition, the projection image generation section 13 generates analysis image data on the basis an analysis result output from the image analysis section 12. Then, the projection image generation section 13 composites the position image data, the map image data, and the analysis image data so as to generate projection image data representing a projection image including the map image, the position image, and the analysis image.

An image V2 in FIG. 11 illustrates that a projection image including a map image M2 and a position image P1 is superimposed onto an optical image O2. By contrast, performing the projection image data generation process depicted in FIG. 10 causes the projection image to further include an analysis image A1. As a result, as indicated by an image V3 in FIG. 11, the optical image O2 has the analysis image A1 superimposed thereon. The cell nuclei in the image V3 are indicated using different colors in accordance with staining intensities, so that the staining states of the cells can be easily determined.

Accordingly, the microscope system 1 can perform the projection image data generation process depicted in FIG. 10 so as to better assist in a task performed by the user while observing the sample by means of an optical image. For example, the user can receive assistance for a pathological diagnosis in addition to assistance for stage operations based on a map image.

The image analysis section 12 in the microscope system 1 may perform an analysis process using a predetermined algorithm or may perform an analysis process using a trained neural network. Parameters for the trained neural network may be generated by training a neural network by means of a different apparatus from the microscope system 1. The control apparatus 10 may download and apply the generated parameters to the image analysis section 12.

Figure 12:
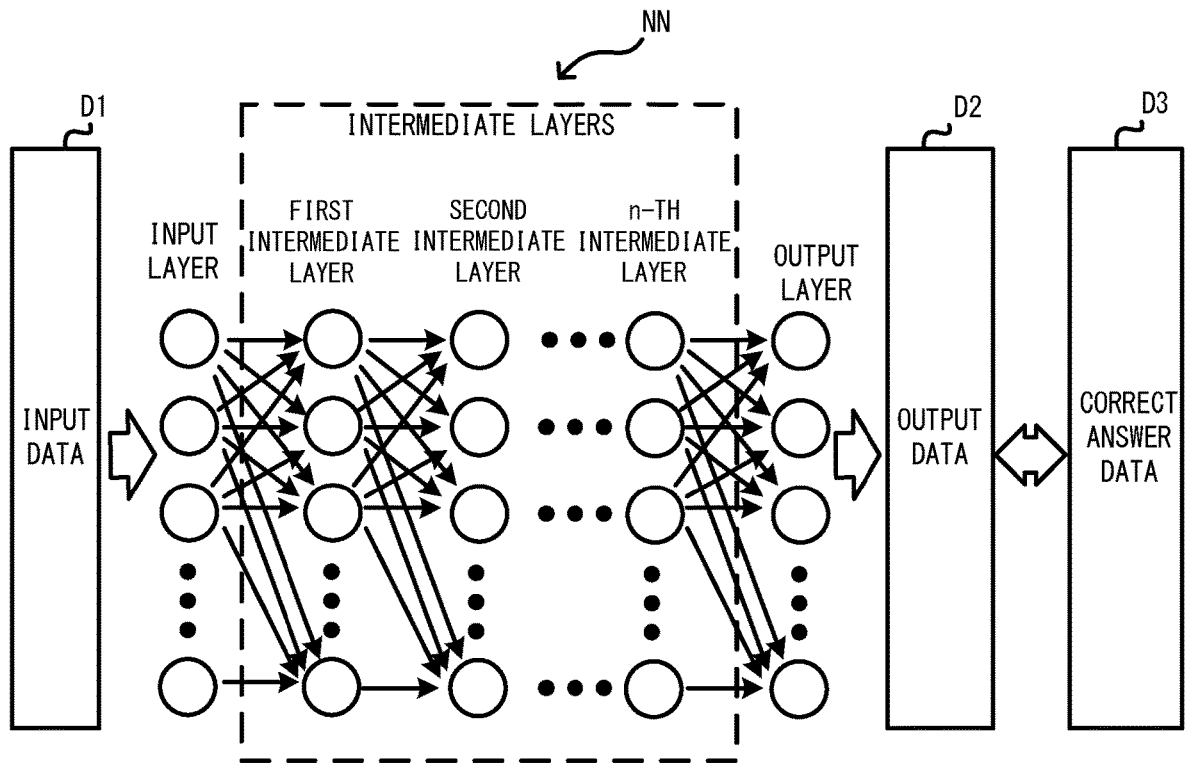
FIG. 12 illustrates the configuration of a neural network.

FIG. 12 illustrates the configuration of a neural network NN. The neural network NN includes an input layer, a plurality of intermediate layers, and an output layer. Output data D2 output from the output layer by inputting input data D1 to the input layer is compared with correct answer data D3. Then, learning is performed using a backpropagation so as to update the parameters for the neural network NN. Note that a set of input data D1 and correct answer data D3 is training data for supervised learning.

Figure 13:
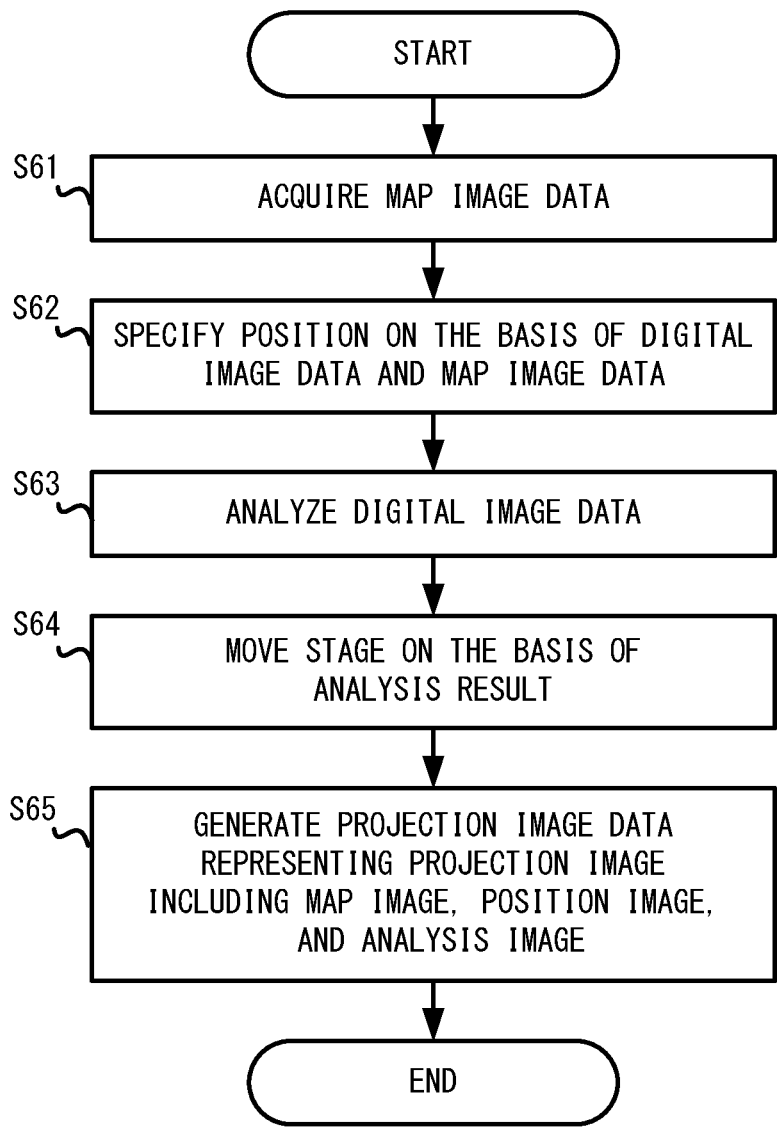
FIG. 13 is still another example of a flowchart of a projection image data generation process performed by a microscope system 1.
Figure 14:
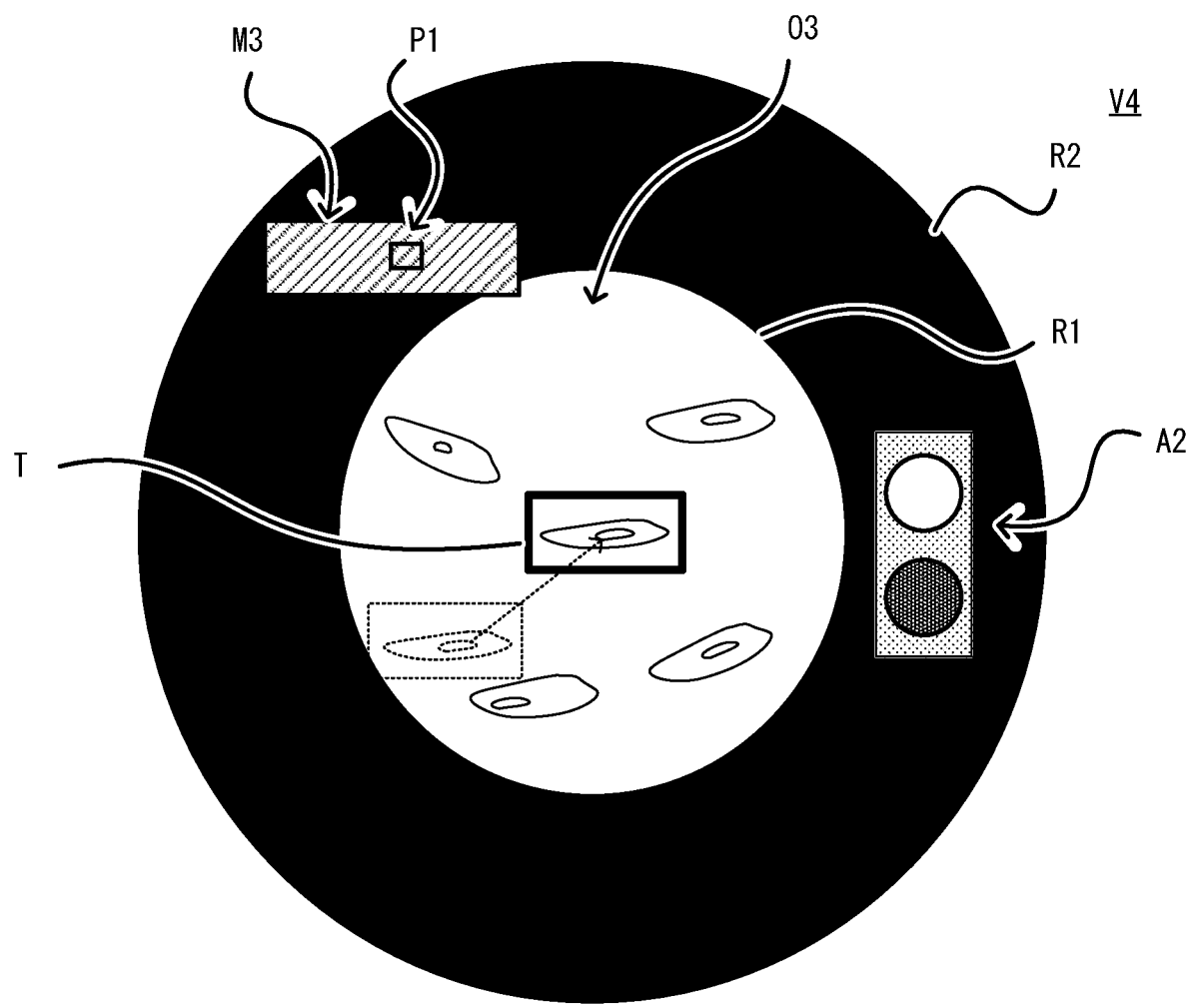
FIG. 14 illustrates still another example of an image viewed through an eyepiece 104 in a microscope system 1.

The microscope system 1 may perform the projection image data generation process depicted in FIG. 13 instead of the projection image data generation process depicted in FIG. 5. FIG. 13 is still another example of a flowchart of a projection image data generation process performed by the microscope system 1. FIG. 14 illustrates still another example of an image viewed through the eyepiece 104 in the microscope system 1.

Upon the projection image data generation process depicted in FIG. 13 being started, the microscope system 1 acquires map image data (step S61) and specifies a position on the basis of digital image data and the map image data (step S62). The processes of steps S61 and S62 are similar to those of steps S31 and S32 depicted in FIG. 5.

Then, the microscope system 1 analyzes the digital image data (step S63). In this example, the image analysis section 12 analyzes the digital image data so as to, for example, track a region of interest. In particular, for example, the image analysis section 12 may track a certain cell within a sample and output a tracking result including position information of the cell and information indicating success or failure of the tracking to the projection image generation section 13 as an analysis result.

Upon the analysis being finished, the microscope system 1 moves the stage 101 on the basis of the analysis result (step S64). In this example, in accordance with an instruction from the control apparatus 10, the stage 101 moves on the basis of the tracking result obtained in step S63 in a manner such that the region of interest is positioned on the optical axis of the objective 102.

Upon the movement of the stage 101 being finished, the microscope system 1 generates projection image data representing a projection image including a map image, a position image, and an analysis image (step S65). In this example, the projection image generation section 13 generates position image data on the basis of the position information output from the image analysis section 12. In addition, the projection image generation section 13 generates analysis image data on the basis the information pertaining to success or failure of the tracking among the analysis result output from the image analysis section 12. Then, the projection image generation section 13 composites the position image data, the map image data, and the analysis image data so as to generate projection image data representing a projection image including the map image, the position image, and the analysis image.

An image V4 in FIG. 14 indicates that a projection image and an optical image O3 have been superimposed on an image plane. The projection image includes a map image M3, a position image P1, and an analysis image A2. The analysis image A2 is similar to a traffic light indicating success or failure of the tracking of a region of interest. The analysis image A2 indicates a blue lamp that is turned on while tracking is successful and a red lamp that is turned on while tracking is unsuccessful. A region of interest T depicted in FIG. 14 includes a cell to be tracked. A rectangular image indicating the region of interest T may also be included in the projection image. Dotted lines indicating a path of movement of the cell may also be included in the projection image.

Figure 16:
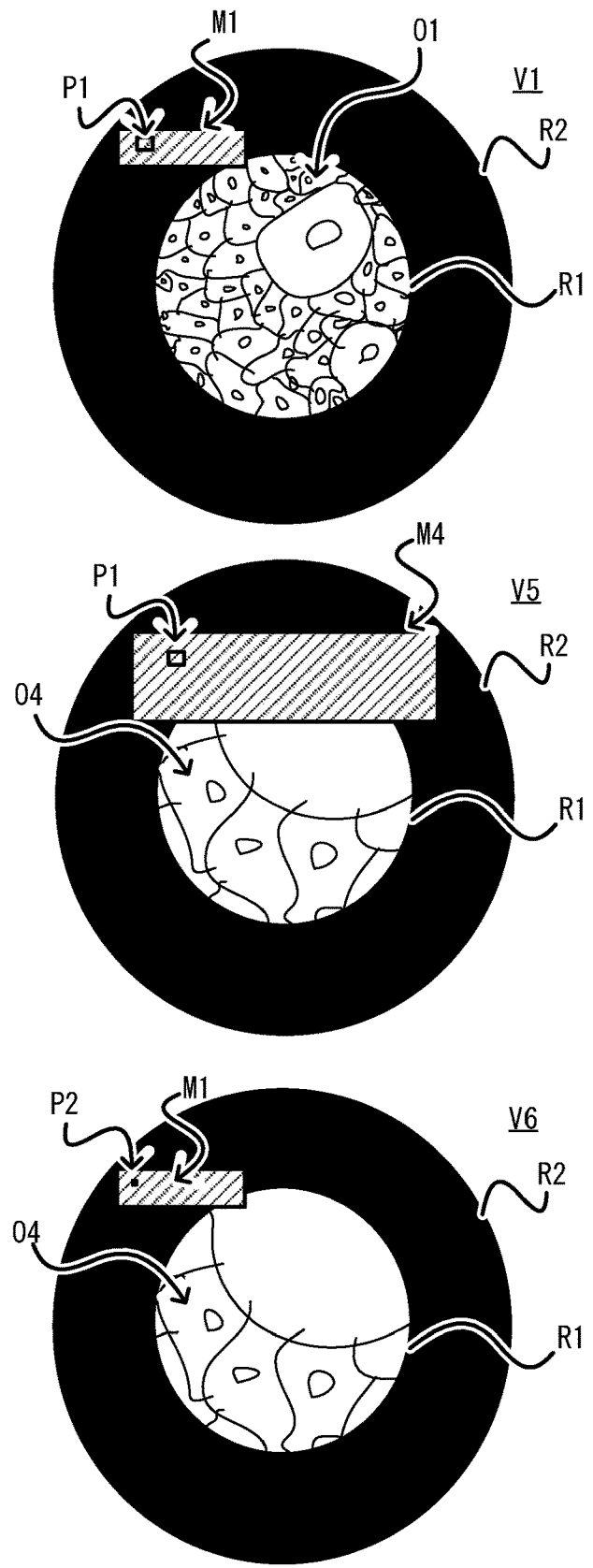
FIG. 16 illustrates yet other examples of images each viewed through an eyepiece 104 in a microscope system 1.

The microscope system 1 may perform the projection image data generation process depicted in FIG. 15 instead of the projection image data generation process depicted in FIG. 5. FIG. 15 is yet another example of a flowchart of a projection image data generation process performed by the microscope system 1. FIG. 16 illustrates yet other examples of images each viewed through the eyepiece 104 in the microscope system 1.

Upon the projection image data generation process depicted in FIG. 15 being started, the microscope system 1 acquires map image data (step S71) and specifies a position on the basis of digital image data and the map image data (step S72). The processes of steps S71 and S72 are similar to those of steps S31 and S32 depicted in FIG. 5.

Then, the microscope system 1 determines a size for a map image in accordance with the size of the actual field of view (step S73). For example, the projection image generation section 13 may determine, irrespective of the size of the actual field of view, a size for the map image such that a position image P1 projected onto the image plane indicates a range having a certain area.

Upon a size being determined for the map image, the microscope system 1 generates projection image data representing a projection image including the map image and the position image (step S74). In this example, the projection image generation section 13 generates map image data with the size determined in step S73. In addition, the projection image generation section 13 generates position image data on the basis of position information output from the image analysis section 12. Then, the projection image generation section 13 composites the map image data and the position image data so as to generate projection image data representing a projection image including the map image and the position image.

An image V1 in FIG. 16 is formed on an image plane during an observation using the objective 102 having a 4-fold magnification. Images V5 and V6 in FIG. 16 are each formed on the image plane during an observation using the objective 102a having a 20-fold magnification. The size of a position image P1 may be maintained irrespective of magnification by changing, as indicated by the images V1 and V5 in FIG. 16, the size of a map image (map image M1, map image M4) in accordance with the size of the actual field of view (magnification). Meanwhile, as indicted by the images V1 and V6 in FIG. 16, the size of the map image M1 may be unchanged even when the size of the actual field of view (magnification) is changed, while the size of the position image (position image P1, position image P2) may be changed according to the size of the actual field of view. In this case, as the magnification of the objective has been changed from 4-fold to 20-fold and thus the observation magnification has been increased 5-fold, the position image P2, which is obtained by reducing the length of each edge of the position image P1 to one-fifth, is displayed on the map image M1.

Figure 17:
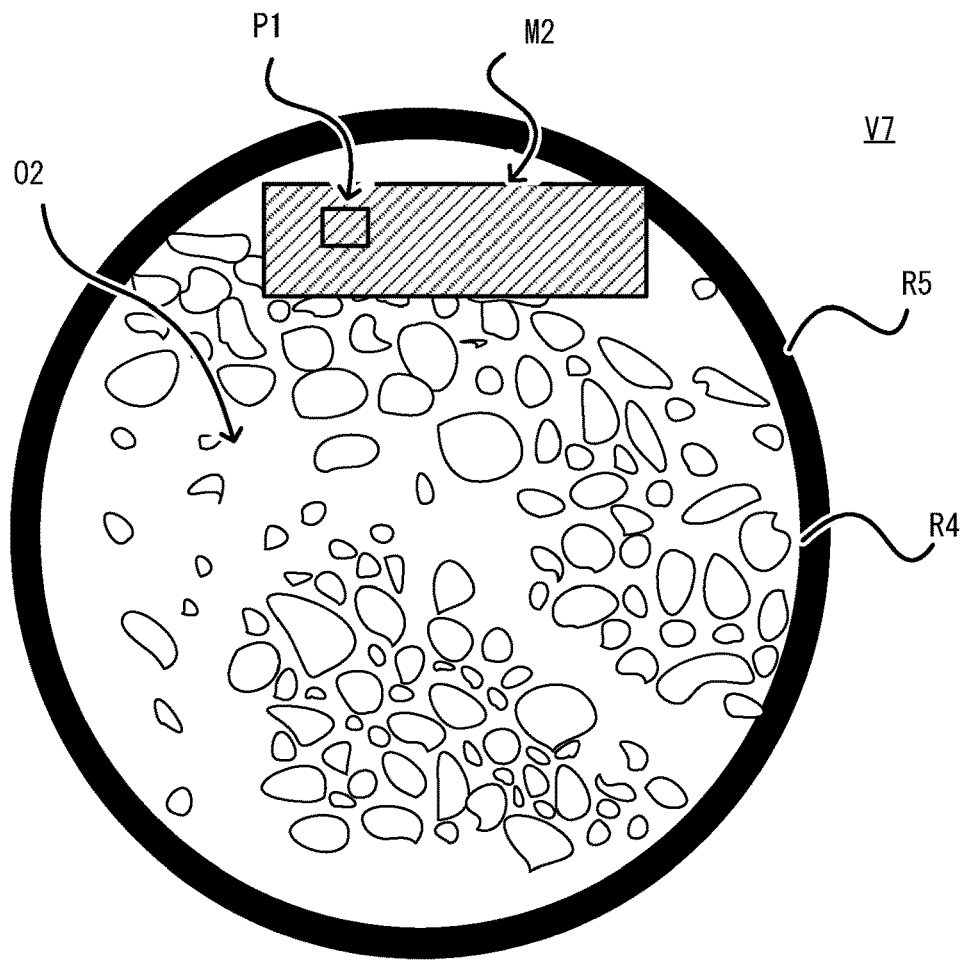
FIG. 17 illustrates a further example of an image viewed through an eyepiece 104 in a microscope system 1.

In the above examples, a map image is projected such that the map image and an optical image have small overlap therebetween. However, as depicted in FIG. 17, a map image may be projected onto an optical image. An image V7 in FIG. 17 indicates an example in which the size of a region R4 onto which an optical image is projected (a region on the image plane on which a pencil of light from the objective is incident) and the size of a region R5 on the image plane that can be viewed through the eyepiece 104 are almost equal.

Second Embodiment

Figure 18:
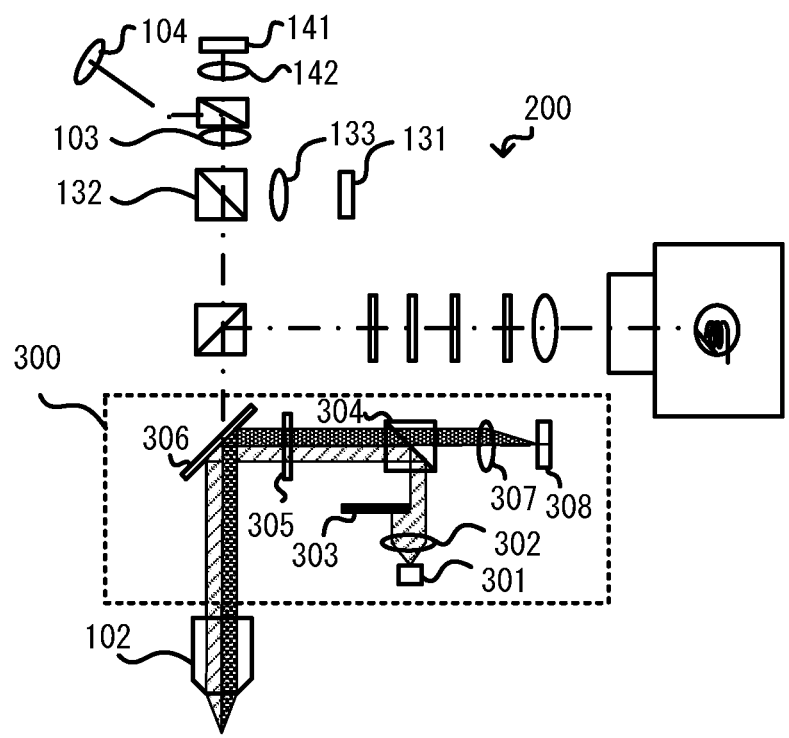
FIG. 18 illustrates the configuration of a microscope 200.

FIG. 18 illustrates the configuration of a microscope 200 in accordance with the present embodiment. The microscope system in accordance with the present embodiment is similar to the microscope system 1 except that the microscope 200 is provided in place of the microscope 100.

The microscope 200 is different from the microscope 100 in that the former includes an autofocus apparatus 300 using an active scheme. Otherwise, the microscope 200 is similar to the microscope 100.

The autofocus apparatus 300 includes a laser 301, a collimater lens 302, a shielding plate 303, a polarization beam splitter 304, a ¼ wavelength plate 305, a dichroic mirror 306, a tube lens 307, and a two-segment detector 308. Laser light emitted from the laser 301 is collimated by the collimater lens 302, and then half thereof is blocked by the shielding plate 303. The other half is reflected by the polarization beam splitter 304, travels via the ¼ wavelength plate 305 and the dichroic mirror 306, and is incident on the objective 102 and caused by the objective 102 to impinge on a sample. Laser light reflected from the sample travels via the objective 102, the dichroic mirror 306, and the ¼ wavelength plate 305 and is incident on the polarization beam splitter 304 again. The laser light, when being incident on the polarization beam splitter 304 for the second time, has already passed the ¼ wavelength plate 305 twice since the reflection by the polarization beam splitter 304. Hence, the laser light has a polarization direction orthogonal to the polarization direction attained when the laser light was incident on the polarization beam splitter 304 for the first time. Thus, the laser light passes through the polarization beam splitter 304. Then, the laser light is caused by the tube lens 307 to impinge on the two-segment detector 308. The distribution of light quantity detected by the two-segment detector 308 varies according to the amount of deviation from an in-focus state. Accordingly, an in-focus state can be attained by adjusting the distance between the stage 101 and the objective 102 in accordance with the distribution of light quantity detected by the two-segment detector 308.

The microscope system in accordance with the present embodiment performs an autofocus process by means of the autofocus apparatus 300 when the stage 101 is moved in a direction orthogonal to the optical axis of the objective 102. Hence, the task burden on the user can be further reduced in comparison with the microscope system 1.

Third Embodiment

FIG. 19 illustrates the configuration of a microscope system 2 in accordance with the present embodiment. The microscope system 2 is different from the microscope system 1 in that the former includes a microscope 400 in place of the microscope 100. The microscope 400 includes an intermediate tube 150 in place of the intermediate tube 130. The intermediate tube 150 is provided with the imaging apparatus 140 and a light deflection element 143 in addition to the projection apparatus 131, the light deflection element 132, and the projection lens 133.

The light deflection element 143 deflects light from a sample toward the image sensor 141. For example, the light deflection element 143 may be a beam splitter such as a half mirror. The light deflection element 143 is desirably disposed on the light path between the light deflection element 132 and the objective 102. Thus, light from the projection apparatus 131 can be prevented from being incident on the image sensor 141.

The microscope system 2 in accordance with the present embodiment can also attain similar effects to the microscope system 1.

Fourth Embodiment

FIG. 20 illustrates the configuration of a microscope system 3 in accordance with the present embodiment. The microscope system 3 is different from the microscope system 1 in that the former includes a microscope 500 in place of the microscope 100. The microscope 500 includes a projection unit 160 between the microscope body 110 and the tube 120.

The projection unit 160 is a projection unit for a microscope provided with the objective 102, the tube lens 103, and the eyepiece 104. The configurations of the optical elements within the projection unit 160 are similar to those within the intermediate tube 150. Thus, the projection unit 160 includes the imaging apparatus 140 that acquires digital image data of a sample on the basis of light therefrom and the projection apparatus 131 that projects a projection image onto the image plane on which an optical image is formed.

The projection unit 160 further includes an imaging control section 161, an image analysis section 162, a projection image generation section 163, and a projection control section 164. The imaging control section 161, the image analysis section 162, the projection image generation section 163, and the projection control section 164 are respectively similar to the imaging control section 11, the image analysis section 12, the projection image generation section 13, and the projection control section 14. Accordingly, detailed descriptions thereof are omitted herein.

In the present embodiment, similar effects to the microscope system 1 can be attained by simply attaching the projection unit 160 to an existing microscope. Accordingly, the projection unit 160 and the microscope system 3 allow an existing microscope system to be easily expanded.

The embodiments described above indicate specific examples to facilitate understanding of the invention, and the present invention is not limited to these embodiments. Various modifications or changes can be made to the microscope system, the projection unit, and the image projection method without departing from the recitation in the claims.

Although the above embodiments indicate examples in which a microscope includes an imaging apparatus, the above-described techniques may be provided for, for example, a scanning microscope. When doing so, the microscope may include a photodetector such as a photomultiplier tube (PMT) in place of the imaging apparatus.

Figure 22:
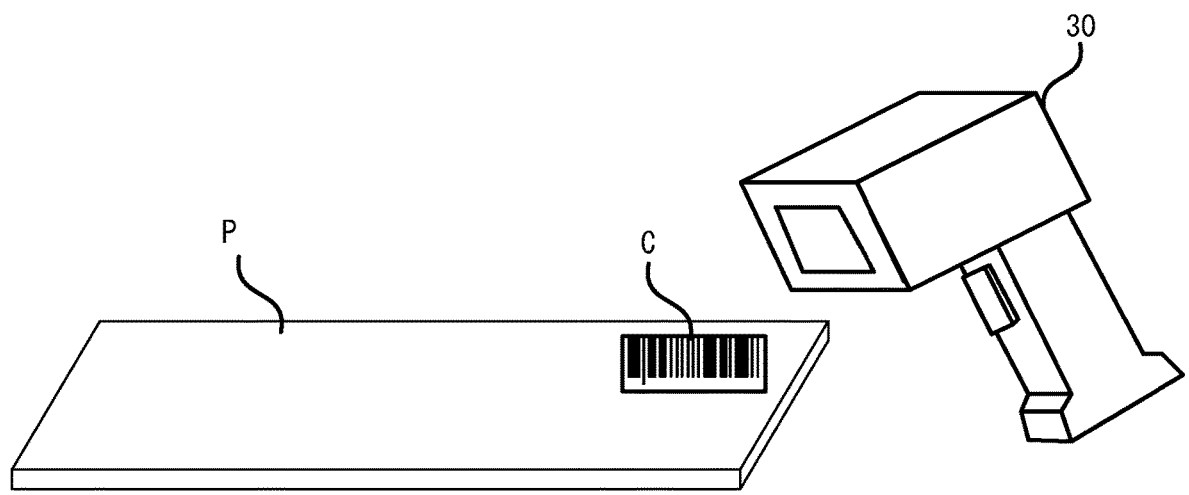
FIG. 22 illustrates an apparatus 30 as an example of a reader device.

A sample may be observed using the microscope system 1 alone or may be observed using the microscope system. 1 as well as another system having an actual field of view with a different size from that of the microscope system 1. For example, the other system may be a microscope system 4 as indicated in FIG. 21 or an observation system different from a microscope system. In this case, map image data may be generated using the microscope system 4, i.e., another system. Meanwhile, another microscope system different from the microscope system for observation may be used to generate map image data for a sample. For example, a WSI system for acquiring whole slide (WS) images by using the WSI technique may be used. In particular, image data of a WS image may be used as map image data. In this case, the microscope system desirably includes a means for automatically collating a WS image acquired in advance with a sample placed on the microscope for observation. For example, the collating means may include a reader device for reading a bar code or an RFID on the sample. The reader device may be, for example, the imaging apparatus 140 from the microscope 100 or an apparatus such as a dedicated apparatus 30 depicted in FIG. 22. Note that FIG. 22 illustrates that the apparatus 30 reads a bar code C on a preparation P. A combination of the apparatus 30 and the control apparatus 10 may form the collating means.

What is claimed is:

1. A microscope system comprising:
an eyepiece;
an objective that guides light from a sample to the eyepiece;
a tube lens that is disposed on a light path between the eyepiece and the objective and forms an optical image of the sample based on light therefrom;
a projection apparatus that projects a projection image including a first assistance image onto an image plane on which the optical image is formed, and a second assistance image indicating a position within the first assistance image that corresponds to the optical image; and
a processor that performs processes,
wherein:
the processes include generating projection image data representing the projection image,
the first assistance image is an image of the sample in which a region wider than an actual field of view corresponding to the optical image is seen,
the first assistance image is projected onto a portion of the image plane that is close to an outer edge of the optical image, and
the projection apparatus projects the second projection image onto the position within the first assistance image projected onto the image plane.

2. The microscope system of claim 1, further comprising:
an imaging apparatus that acquires digital image data of the sample based on light therefrom,
wherein the processes include specifying the position based on the digital image data acquired by the imaging apparatus and first assistance image data representing the first assistance image.

3. The microscope system of claim 2, wherein the specifying the position includes specifying the position by comparing the first assistance image with a digital image represented by the digital image data.

4. The microscope system of claim 3, wherein the processes include updating the position based on coordinate information of the first assistance image and a movement amount of the sample.

5. The microscope system of claim 4, wherein the updating the position includes calculating the movement amount based on a plurality of pieces of digital image data of the sample acquired by the imaging apparatus.

6. The microscope system of claim 4, further comprising:
a motorized stage on which the sample is placed,
wherein the updating the position includes calculating the movement amount based on control information of the motorized stage.

7. The microscope system of claim 1, further comprising:
an imaging apparatus that acquires digital image data of the sample based on light therefrom,
wherein the generating the projection image data includes generating first assistance image data representing the first assistance image based on a plurality of pieces of digital image data of the sample acquired by the imaging apparatus.

8. The microscope system of claim 7, wherein the generating the first assistance image data includes generating the first assistance image data every time one of the plurality of pieces of digital image data is acquired.

9. The microscope system of claim 7, further comprising:
a motorized stage on which the sample is placed,
wherein after the motorized stage has moved over a designated range, the generating the first assistance image data includes generating the first assistance image data based on a plurality of pieces of digital image data acquired during the movement of the motorized stage.

10. The microscope system of claim 7, wherein the plurality of pieces of digital image data include at least two pieces of digital image data acquired at focal positions of the objective that are different in an optical-axis direction of the objective.

11. The microscope system of claim 10, wherein the first assistance image is an extended focus image.

12. The microscope system of claim 7, wherein the processes include recording the first assistance image data and coordinate information of digital images represented by the plurality of pieces of digital image data.

13. The microscope system of claim 12, wherein the recording the first assistance image data and the coordinate information includes recording the coordinate information in association with the digital image data.

14. The microscope system of claim 12, wherein:
the processes include analyzing the digital image data, and
the recording the first assistance image data and the coordinate information includes recording the coordinate information in association with an analysis result of the digital image data.

15. The microscope system of claim 1, further comprising:
an imaging apparatus that acquires digital image data of the sample based on light therefrom,
wherein:
the processes include analyzing the digital image data acquired by the imaging apparatus, and
the projection image further includes a third assistance image indicating an analysis result provided by the image analysis section.

16. The microscope system of claim 15, wherein the analyzing the digital image data includes analyzing the digital image data by using a trained neural network.

17. The microscope system of claim 1, further comprising:
an imaging apparatus that acquires digital image data of the sample based on light therefrom,
wherein:
the processes include tracking a region of interest within the sample based on the digital image data, and
the projection image further includes a fourth assistance image indicating success or failure of tracking of the region of interest.

18. The microscope system of claim 17, further comprising:
a motorized stage on which the sample is placed,
wherein, based on a tracking result of the region of interest, the motorized stage moves such that the region of interest is positioned on an optical axis of the objective.

19. The microscope system of claim 1, wherein the generating the projection image data includes, in accordance with a size of the actual field of view, determining a size for the first assistance image on the image plane.

20. The microscope system of claim 1, further comprising:
a motorized stage on which the sample is placed; and
an autofocus apparatus using an active scheme,
wherein the autofocus apparatus performs an autofocus process when the motorized stage moves.

21. The microscope system of claim 1, wherein the processes include recording, in response to a detected event, information corresponding to the event.

22. A projection unit for a microscope provided with an objective, a tube lens, and an eyepiece, the projection unit comprising:
- an imaging apparatus that acquires digital image data of a sample based on light therefrom;
- a projection apparatus that projects a projection image including (i) a first assistance image onto an image plane on which an optical image formed by the tube lens is formed, and (ii) a second assistance image indicating a position within the first assistance image that corresponds to the optical image; and
- a processor that performs processes, wherein:
the processes include generating a projection image data representing the projection image,
the first assistance image is an image of the sample in which a region wider than an actual field of view corresponding to the optical image is seen,
the first assistance image is projected onto a portion of the image plane that is close to an outer edge of the optical image, and
the projection apparatus projects the second projection image onto the position within the first assistance image projected onto the image plane.

23. An image projection method implemented by a microscope system, the image projection method comprising performing, by the microscope system:
- generating projection image data representing a projection image including (i) a first assistance image, the first assistance image being an image of a sample in which a region wider than an actual field of view corresponding to an optical image of the sample is seen, and (ii) a second assistance image, the second assistance image being an image indicating a position within the first assistance image that corresponds to the optical image; and
- projecting the projection image onto an image plane on which the optical image is formed based on light from the sample, such that (i) the first assistance image is projected onto a portion of the image plane that is close to an outer edge of the optical image, and (ii) the second projection image is projected onto the position within the first assistance image projected onto the image plane.

24. A microscope system comprising:
- an eyepiece;
- an objective that guides light from a sample to the eyepiece;
- a tube lens that is disposed on a light path between the eyepiece and the objective and forms an optical image of the sample based on light therefrom;
- an imaging apparatus that acquires digital image data of the sample based on light therefrom;
- an image analysis section that analyzes the digital image data acquired by the imaging apparatus, by using a trained neural network;
- a projection image generation section that generates projection image data representing a projection image including a first assistance image and a third assistance image, the first assistance image being an image of the sample in which a region wider than an actual field of view corresponding to the optical image is seen, and the third assistance image being an image indicating an analysis result provided by the image analysis section; and
- a projection apparatus that projects the projection image onto an image plane on which the optical image is formed, wherein the projection apparatus has, on the image plane, a projection allowing region wider than a region on the image plane on which the optical image is formed; and wherein the first assistance image is projected onto a location close to an outer periphery of the optical image on the image plane on which the optical image is formed, and the third assistance image is projected onto the optical image.

* * * * *